(12) United States Patent
Hosoya et al.

(10) Patent No.: US 12,175,758 B2
(45) Date of Patent: Dec. 24, 2024

(54) CASE QUERY APPARATUS ACQUIRES QUERY CONDITION AND META QUERY CONDITION TO CALCULATE A SIMILARITY DEGREE BETWEEN THE QUERY CONDITION AND REFERENCE CASES, CASE QUERY METHOD AND A NON-TRANSITORY COMPUTER READABLE STORAGE MEDIUM

(71) Applicant: KABUSHIKI KAISHA TOSHIBA, Tokyo (JP)

(72) Inventors: Yusuke Hosoya, Fuchu Tokyo (JP); Toshiaki Nakasu, Chofu Tokyo (JP); Isao Mihara, Tokyo (JP); Nao Mishima, Inagi Tokyo (JP); Quoc Viet Pham, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 361 days.

(21) Appl. No.: 17/652,739

(22) Filed: Feb. 28, 2022

(65) Prior Publication Data

US 2023/0077031 A1 Mar. 9, 2023

(30) Foreign Application Priority Data

Sep. 9, 2021 (JP) .................................. 2021-146888

(51) Int. Cl.
*G06V 20/52* (2022.01)
*G06F 16/535* (2019.01)
(Continued)

(52) U.S. Cl.
CPC ............ *G06V 20/52* (2022.01); *G06F 16/535* (2019.01); *G06F 16/538* (2019.01); *G06T 7/11* (2017.01);
(Continued)

(58) Field of Classification Search
None
See application file for complete search history.

(56) References Cited

U.S. PATENT DOCUMENTS

| 8,140,530 B2 * | 3/2012 | Terao | ...................... G06F 16/70 |
| | | | 707/736 |
| 2009/0319513 A1 * | 12/2009 | Terao | ...................... G06F 16/70 |
| | | | 707/999.005 |

(Continued)

FOREIGN PATENT DOCUMENTS

| JP | 2006-163527 A | 6/2006 |
| JP | 2014-187645 A | 10/2014 |

(Continued)

OTHER PUBLICATIONS

N. Vo et al. "Composing Text and Image for Image Retrieval—An Empirical Odyssey," CVPR2019, pp. 6439-6448 (2019).

(Continued)

*Primary Examiner* — Haris Sabah
(74) *Attorney, Agent, or Firm* — Finnegan, Henderson, Farabow, Garrett & Dunner, LLP

(57) ABSTRACT

According to one embodiment, a case query apparatus includes a processing circuit. The processing circuit acquires a query condition represented by a query target. The processing circuit acquires a meta query condition represented by a description concerning a viewpoint to focus on when querying a case similar to the query condition. The processing circuit calculates a similarity degree between the query condition and each of a plurality of reference cases represented by a query target. The processing circuit queries a similar reference case similar to the query condition from a viewpoint of the meta query condition, among the plurality of reference cases, based on the similarity degree. The processing circuit presents a query result on the similar reference case.

23 Claims, 15 Drawing Sheets

(51) Int. Cl.

| | |
|---|---|
| *G06F 16/538* | (2019.01) |
| *G06T 7/11* | (2017.01) |
| *G06V 10/25* | (2022.01) |
| *G06V 10/26* | (2022.01) |
| *G06V 10/40* | (2022.01) |
| *G06V 10/74* | (2022.01) |
| *G06V 10/80* | (2022.01) |
| *G06F 40/35* | (2020.01) |

(52) U.S. Cl.
CPC .............. *G06V 10/25* (2022.01); *G06V 10/26* (2022.01); *G06V 10/40* (2022.01); *G06V 10/761* (2022.01); *G06V 10/806* (2022.01); *G06F 40/35* (2020.01); *G06T 2207/20081* (2013.01)

(56) References Cited

U.S. PATENT DOCUMENTS

| | | | |
|---|---|---|---|
| 2015/0293943 A1* | 10/2015 | Kim | G06F 16/7867 707/752 |
| 2019/0188840 A1* | 6/2019 | Kwon | G06V 10/764 |
| 2020/0089703 A1 | 3/2020 | Yamaji et al. | |
| 2021/0233108 A1* | 7/2021 | Gouneili | H04N 21/6582 |
| 2022/0122345 A1* | 4/2022 | Wakabayashi | G06V 10/761 |
| 2022/0129693 A1 | 4/2022 | /H. S/ | |

FOREIGN PATENT DOCUMENTS

| | | |
|---|---|---|
| JP | 2020-42684 A | 3/2020 |
| JP | 2022-71675 A | 5/2022 |

OTHER PUBLICATIONS

A-M Oncescu et al. "Audio Retrieval with Natural Language Queries," Interspeech 2021, arXiv:2105.02192v2, 6 pages (Jul. 22, 2021).

L. Li et al., "Relation-Aware Graph Attention Network for Visual Question Answering," ICCV2019, arXiv:1903.12314v3, 10 pages (2019).

J. Lei et al. "TVQA: Localized, Compositional Video Question Answering," EMNLP2018, arXiv:1809.01696v2, 13 pages (2019).

S. Zhang et al. "Automatic Generation of Grounded Visual Questions," IJCAI2017, pp. 4235-4243 (2017).

* cited by examiner

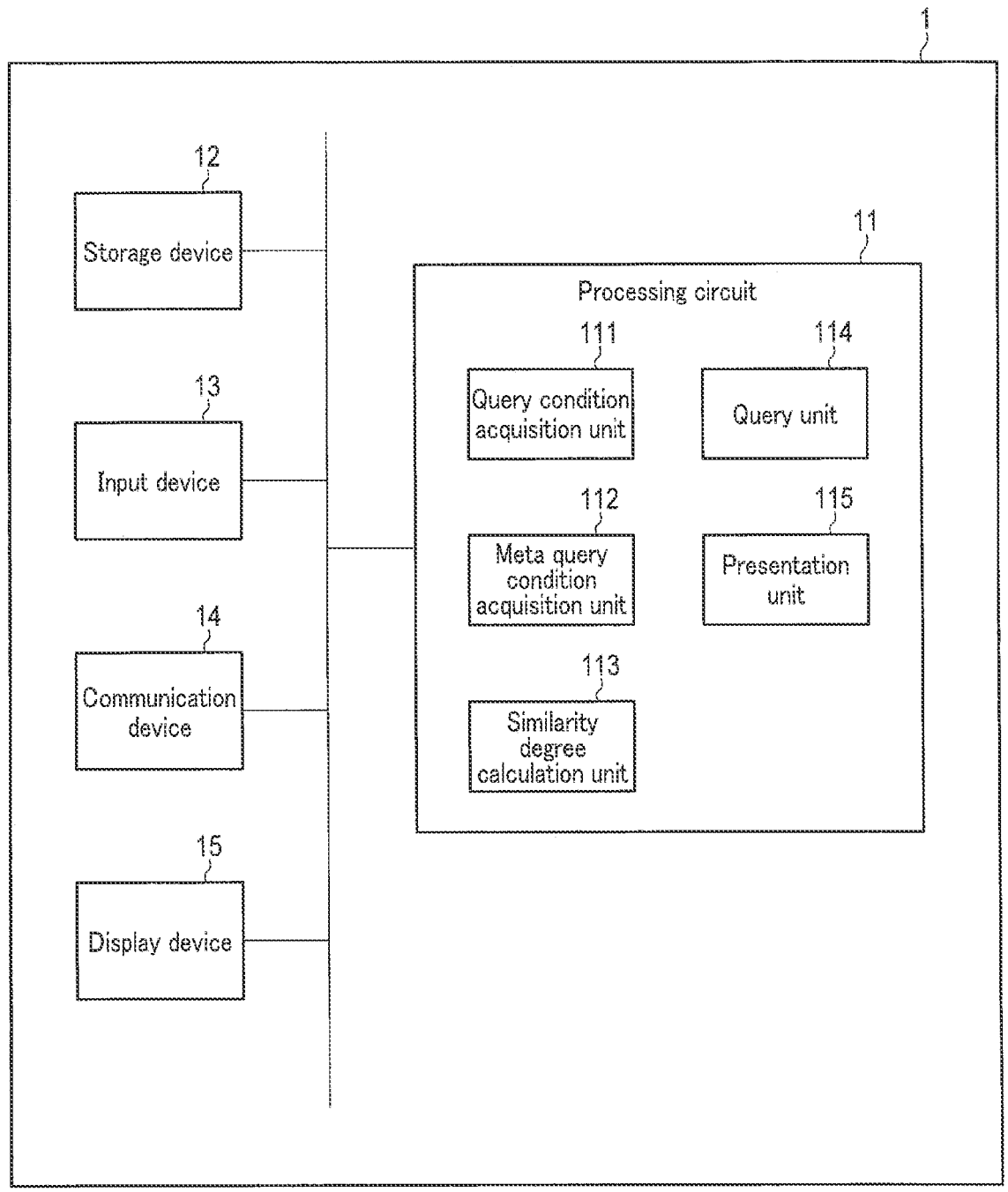
F I G. 1

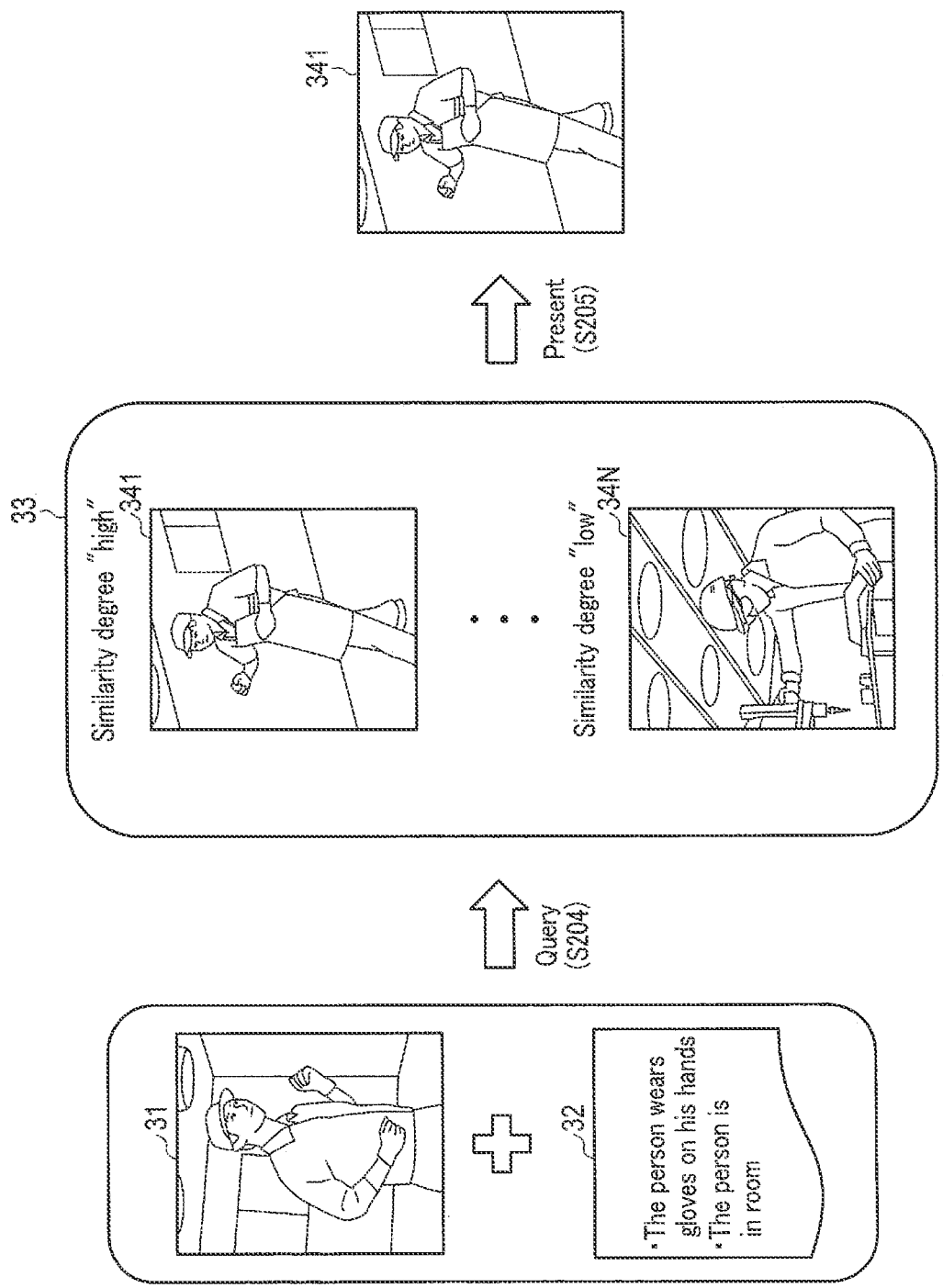
F I G. 3

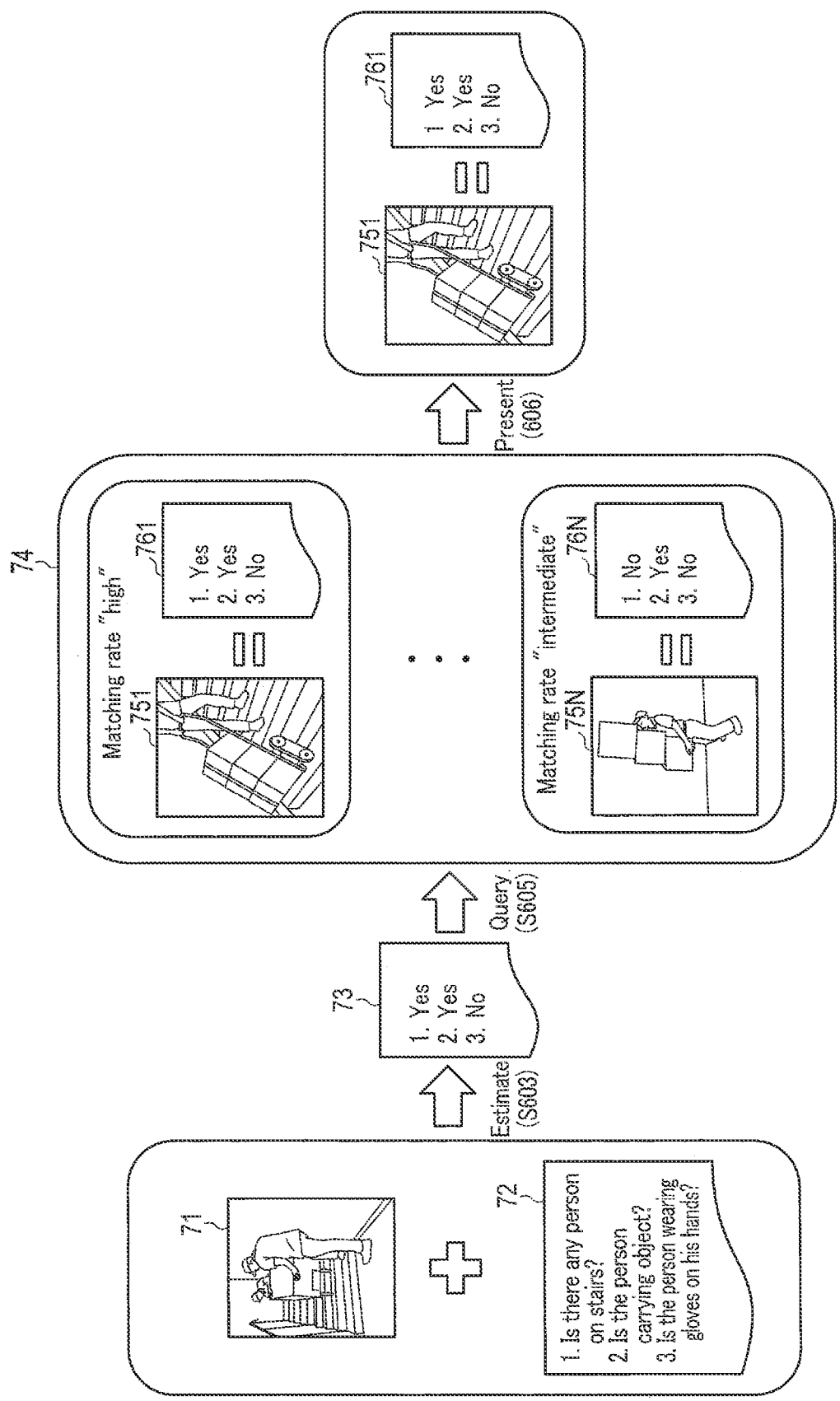
F I G. 7

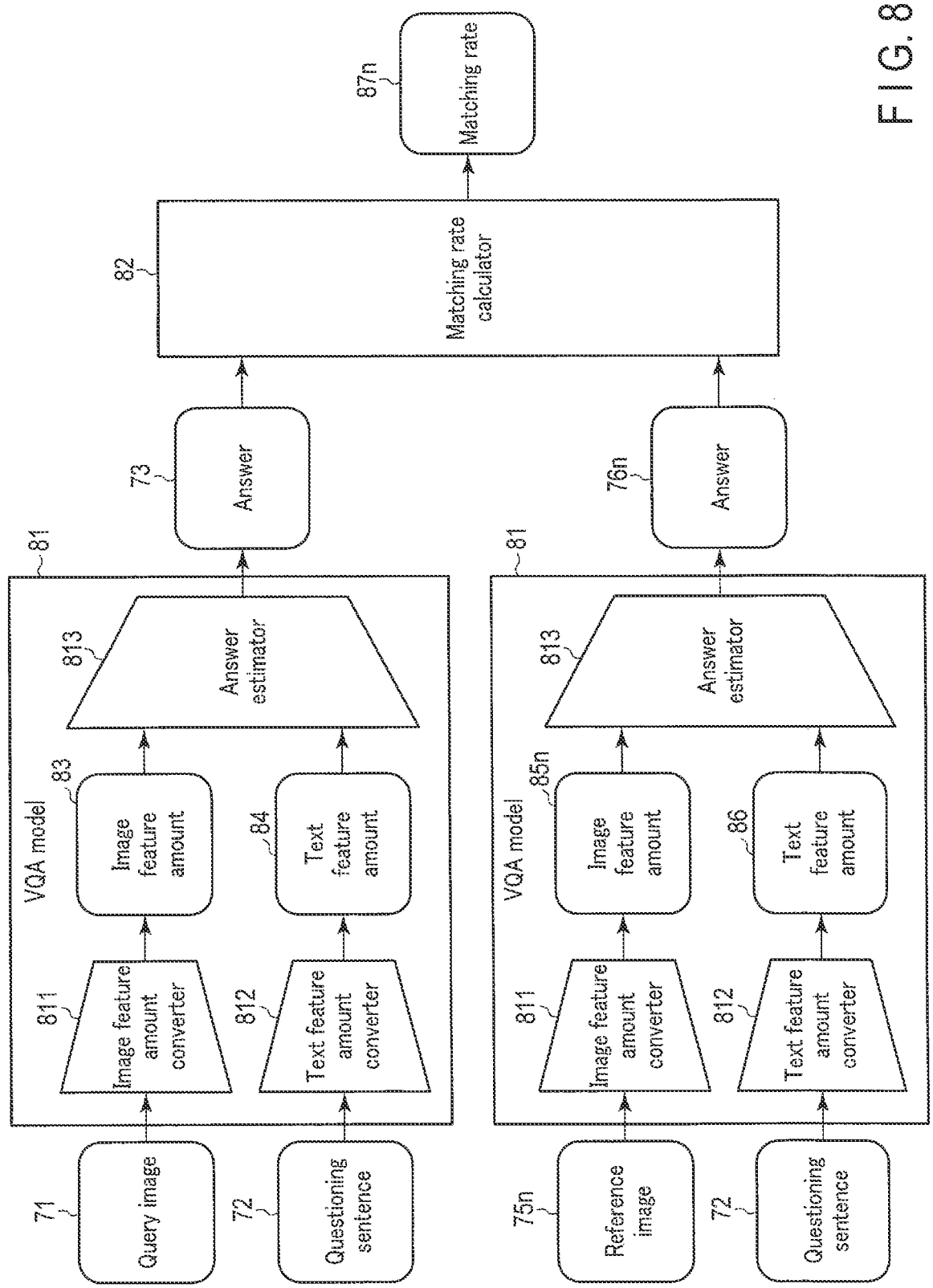
F I G. 8

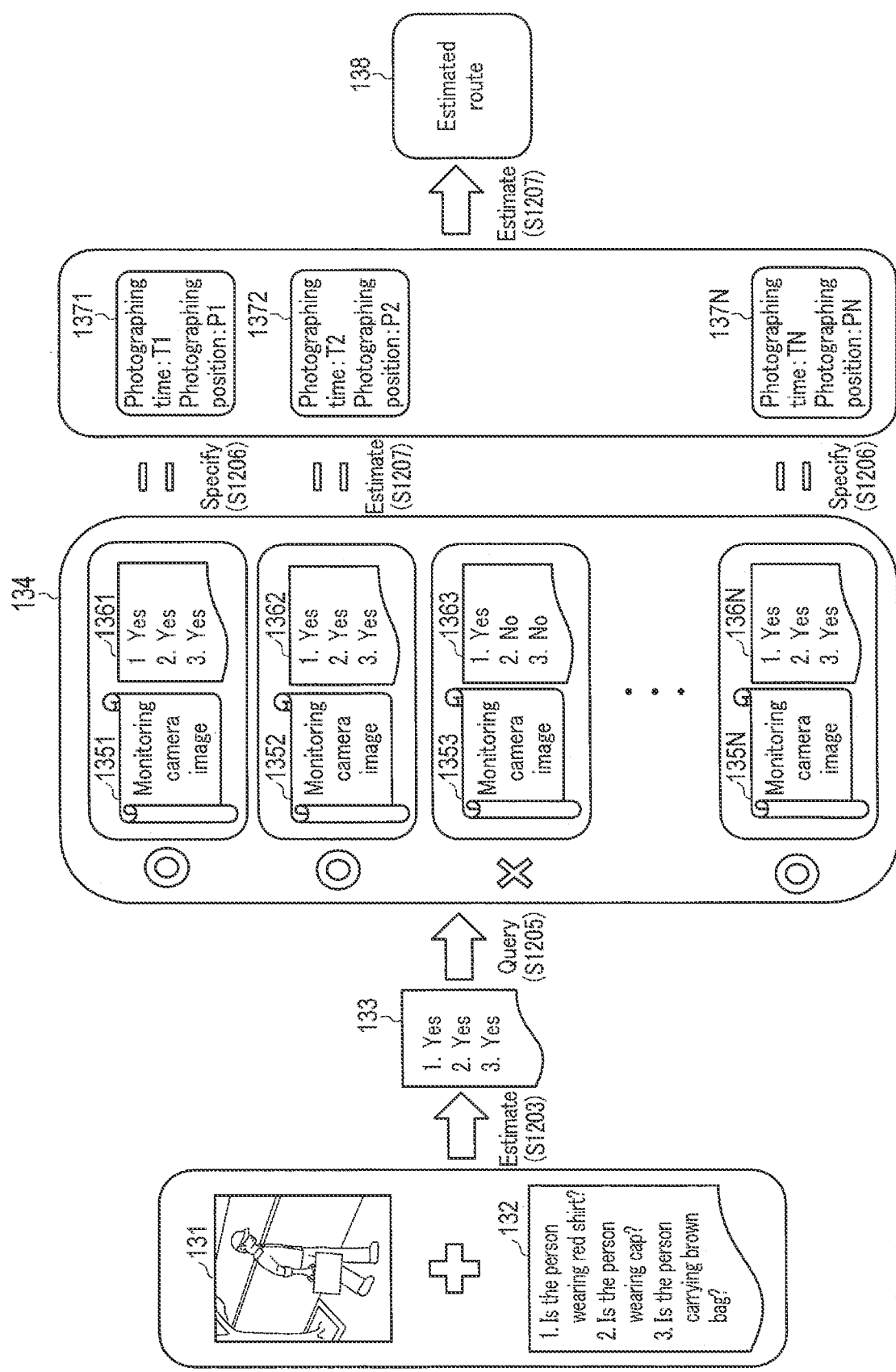
F I G. 13

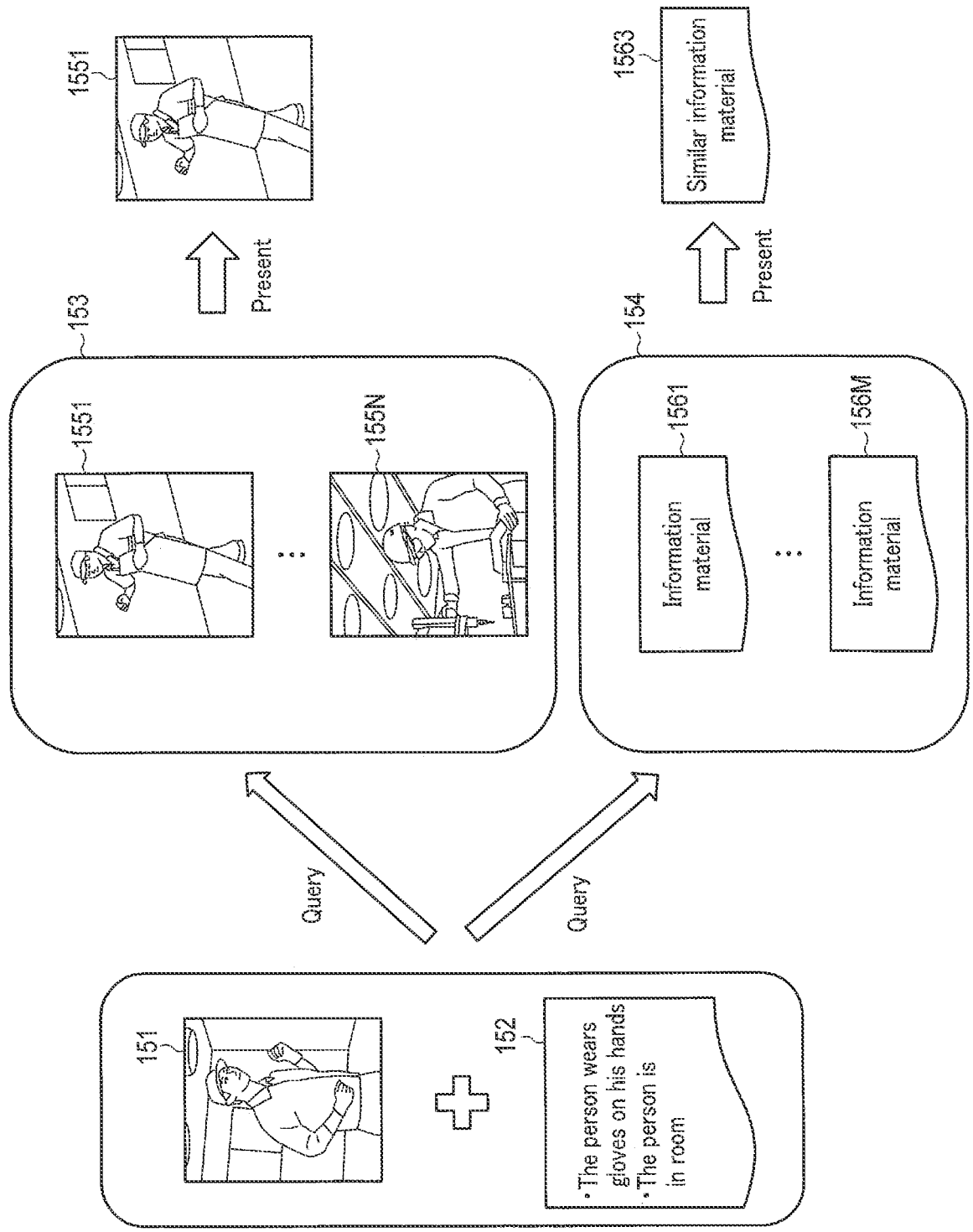
F I G. 15

CASE QUERY APPARATUS ACQUIRES QUERY CONDITION AND META QUERY CONDITION TO CALCULATE A SIMILARITY DEGREE BETWEEN THE QUERY CONDITION AND REFERENCE CASES, CASE QUERY METHOD AND A NON-TRANSITORY COMPUTER READABLE STORAGE MEDIUM

CROSS-REFERENCE TO RELATED APPLICATIONS

This application is based upon and claims the benefit of priority from Japanese Patent Application No. 2021-146888, filed Sep. 9, 2021, the entire contents of which are incorporated herein by reference.

FIELD

Embodiments described herein relate generally to a case query apparatus and method and a storage medium.

BACKGROUND

A technique according to non-patent literature 1 (N. Vo et al., "Composing Text and Image for Image Retrieval—An Empirical Odyssey", arXiv: 1812.07119v1 [cs.CV], Dec. 18, 2018) is configured to provide a model with a text describing an image feature to be queried, in addition to a query image, as inputs, so as to acquire a similar image matching the condition. A technique according to patent literature 1 is configured to set and learn, in advance, attributes pertaining to an object, such as the color and texture of the object, as similar viewpoints, and query a similar image for each extracted image region concerning the set viewpoint. These techniques have difficulty in performing a query in consideration of context information expressing the relationship established between objects or non-objects or the relationship between an object and a non-object because information input as query conditions is limited to local attributes pertaining to an individual object, such as the name, color, and pattern of an object.

BRIEF DESCRIPTION OF THE DRAWINGS

FIG. 1 is a block diagram showing an example of the arrangement of a case query apparatus according to this embodiment;

FIG. 3 is a view showing an outline of the case query processing shown in FIG. 2;

FIG. 7 is a view showing an outline of the case query processing shown in FIG. 6;

FIG. 8 is a block diagram showing a process of calculating a matching rate according to application example 1;

FIG. 13 is a view showing an outline of the person tracking processing shown in FIG. 12;

FIG. 15 is a view showing an outline of case query processing according to application example 5.

DETAILED DESCRIPTION

Figure 2:
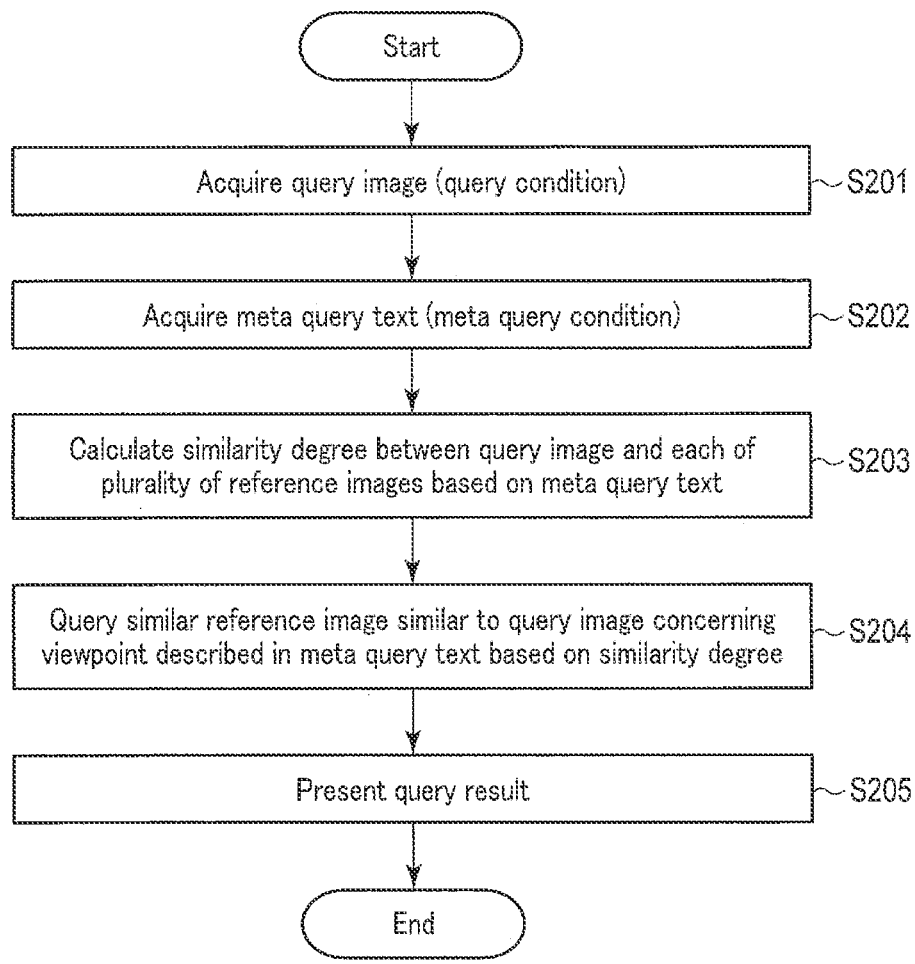
FIG. 2 is a flowchart showing a procedure for an example of case query processing by the case query apparatus according to this embodiment.

A case query apparatus according to an embodiment includes a processing circuit. The processing circuit acquires a query condition represented by a query target. The processing circuit acquires a meta query condition represented by a description concerning a viewpoint to focus on when querying a case similar to the query condition. The processing circuit calculates a similarity degree between the query condition and each of a plurality of reference cases represented by a query target. The processing circuit queries a similar reference case similar to the query condition from a viewpoint of the meta query condition, among the plurality of reference cases, based on the similarity degree. The processing circuit presents a query result on the similar reference case.

The case query apparatus and method and the recording medium according to this embodiment will be described below with reference to the accompanying drawings.

FIG. 1 shows an example of the arrangement of a case query apparatus 1 according to this embodiment. As shown in FIG. 1, the case query apparatus 1 is a computer including a processing circuit 11, a storage device 12, an input device 13, a communication device 14, and a display device 15. The processing circuit 11, the storage device 12, the input device 13, the communication device 14, and the display device 15 perform data communication via a bus.

The processing circuit 11 includes a processor such as a CPU (Central Processing Unit) and a memory such as a RAM (Random Access Memory). The processing circuit 11 includes a query condition acquisition unit 111, a meta query condition acquisition unit 112, a similarity degree calculation unit 113, a query unit 114, and a presentation unit 115. The processing circuit 11 implements the functions of the respective units 111 to 115 by executing a case query program. The case query program is stored in a non-transitory computer-readable storage medium such as the storage device 12. The case query program may be implemented as a single program describing all the functions of the units 111 to 115 or may be implemented as a plurality of modules divided into several function units. Alternatively, the units 111 to 115 each may be implemented by an integrated circuit such as an ASIC (Application Specific Integrated Circuit). In this case, the respective units may be implemented in a single integrated circuit or may be individually integrated in a plurality of integrated circuits.

The query condition acquisition unit 111 acquires a query condition represented by data of a case as a query target. For example, a still image or moving image captured on site is used as a data medium. Note, however, that a data medium is not limited to a still image or moving image, and audio data recorded on site, text data such as an information material, or the sensor value acquired from a measuring instrument may be used. A case indicates a fact corresponding to the data. A case as a query target may be an event including a disaster, accident, failure and/or incident or a case before the occurrence of a such event. A query condition may be acquired in real time or acquired from case data accumulated in the past.

The meta query condition acquisition unit 112 acquires a meta query condition which is a description concerning a viewpoint to focus on in querying a case similar to the query condition. More specifically, a meta query condition is text data which is a description expressing, in a natural language sentence (spoken language), the relationship between a plurality of targets to be focused which are included in a query condition. Such a meta query condition may include a declarative sentence like "The person wears gloves on his hands" or a questioning sentence like "Does the person wear gloves on his hands?". A meta query condition is not limited to a natural language sentence expressing the relationship between a plurality of targets and may be a word expressing an attribute of an individual object such as "black gloves".

The similarity degree calculation unit 113 calculates the similarity degree between a query condition and each of a plurality of reference cases based on a meta query condition. A reference case is represented by the data of a case as a query target. A plurality of reference cases are stored in the storage device 12 or the like. Assume that similar disaster cases and the like that occurred in the past are to be queried. In this case, the following data are stored in the storage device 12: still images and moving images that are obtained by photographing disaster sites at the time or reproduce them, texts describing disaster situations at the time and ways to cope with the disasters, audio data obtained by recording abnormal sounds from broken machines that were disaster factors, and data of various types of media such as sensor measurement values.

The query unit 114 queries a similar reference case similar to a query from the viewpoint of a meta query, among a plurality of reference cases stored in the storage device 12, based on similarity degrees. For example, a reference case whose similarity degree is equal to or higher than a threshold is extracted as a similar reference case.

The presentation unit 115 presents the query result obtained by the query unit 114. For example, when the query unit 114 extracts a similar reference case, the presentation unit 115 presents the similar reference case. When the query unit 114 does not extract any similar reference case, the presentation unit 115 presents information indicating that there is no similar reference case. The query result is presented by being displayed on the display device 15.

The storage device 12 is constituted by a ROM (Read Only Memory), HDD (Hard Disk Drive), SSD (Solid State Drive), integrated circuit storage device, and the like. The storage device 12 stores a case query program and the like. The storage device 12 functions as a database storing a plurality of reference cases. This database is called a reference case databased.

The input device 13 inputs various types of commands from a user such as a client who gives a query request or an operator who performs a query operation upon receiving a query request. As the input device 13, a keyboard, a mouse, various switches, a touch pad, a touch panel display, and the like can be used. An output signal from the input device 13 is supplied to the processing circuit 11. Note that the input device 13 may be the input device of a computer connected to the processing circuit 11 wiredly or wirelessly.

The communication device 14 is an interface for performing data communication with respect to an external device connected to the case query apparatus 1 via a network. For example, the external device is a device that collects query conditions and reference cases. The communication device 14 receives query conditions and reference cases collected by such an external device via a network.

The display device 15 displays various types of information. For example, the display device 15 displays a query result under the control of the presentation unit 115. As the display device 15, a CRT (Cathode-Ray Tube) display, a liquid crystal display, an organic EL (Electro Luminescence) display, an LED (Light-Emitting Diode) display, a plasma display, or another arbitrary display known in the technical field can appropriately be used. Alternatively, the display device 15 may be a projector.

The case query apparatus 1 will be described in detail below. In the following description, assume that data media for query conditions and reference cases are images. In this case, an image as a query condition is called a query image, and an image as a reference case is called a reference image. In addition, a meta query condition is a text (to be referred to as a meta query text hereinafter) describing a viewpoint to focus on in querying a similar reference image.

FIG. 2 is a flowchart showing a procedure for an example of case query processing by the case query apparatus 1 according to this embodiment. FIG. 3 is a view showing an outline of the case query processing shown in FIG. 2. As shown in FIGS. 2 and 3, the query condition acquisition unit 1/1 acquires a query image (query condition) 31 (step S201). Assume that in this embodiment, the query image 31 is a still image depicting a site worker in a factory.

When step S201 is executed, the meta query condition acquisition unit 112 acquires a meta query text (meta query condition) 32 (step S202). The text 32 is a sentence describing a viewpoint to be noted by the user among targets depicted in the query image 31. The text 32 according to this embodiment is a description expressing the relationship between a plurality of targets depicted in the query image 31 as the viewpoint to be noted by the user. Targets to be noted may be objects such as persons or articles and non-objects such as stairs, hallways, ceilings, roads, and skies. The relationship between targets may be any of the following: the relationship between objects, the relationship between non-objects, and the relationship between an object and a non-object. The meta query text 32 should be a natural language sentence that can describe a relationship. The meta query text 32 may include one description expressing a relationship or two or more descriptions.

Assume that the meta query text 32 according to this embodiment includes two descriptions "The person wears gloves on his hands" and "The person is in a room". The former expresses the relationship between the object "hands" and the object "gloves", that is, the relationship between the objects. The latter expresses the relationship between the object "person" and the non-object "in a room", that is, the relationship between the object and the non-object. Note that the meta query text 32 may include a noun phrase expressing an attribute of an object, such as "black gloves" in the above natural language sentence.

When step S202 is executed, the similarity degree calculation unit 113 calculates the similarity degree between the query image 31 acquired in step S201 and each of a plurality of reference images 34n stored in a reference case database 33 based on the meta query text 32 acquired in step S202 (step S203). Note that "n" represents a natural number indicating the number of each reference image 34 stored in the reference case database 33 and takes a value defined by $1 \leq n \leq N$. "N" is a natural number indicating the total number of reference images 34 stored in the reference case database 33 and has a value of 2 or more. The reference case database 33 stores many reference images 34$n$ related to site workers working in factories and the like.

Various types of methods can be used as similarity degree calculation methods. For example, the similarity degree calculation unit 113 calculates a first feature amount based on a combination of the query image 31 and the meta query text 32 and a second feature amount based on a combination of each of the plurality of reference images 34$n$ and the meta query text 32 and calculates the distance between the first feature amount and the second feature amount as a similarity degree. The first feature amount is obtained by quantifying the degree of the relationship between targets described by the meta query text 32 in the query image 31. The second feature amount is obtained by quantifying the degree of the relationship between targets described by the meta query text 32 in the reference image 34$n$.

The following is an example of a method of calculating the first and second feature amounts. The similarity degree calculation unit 113 calculates the feature amount of the query image 31, the feature amount of the meta query text 32, and the feature amount of the reference image 34$n$ by projecting the query image 31, the meta query text 32, and the reference image 34$n$ onto the same feature amount space. The similarity degree calculation unit 113 calculates the first feature amount based on the feature amount of the query image 31 and the feature amount of the meta query text 32 and calculates the second feature amount based on the feature amount of the reference image 34$n$ and the feature amount of the meta query text 32.

Figure 4:
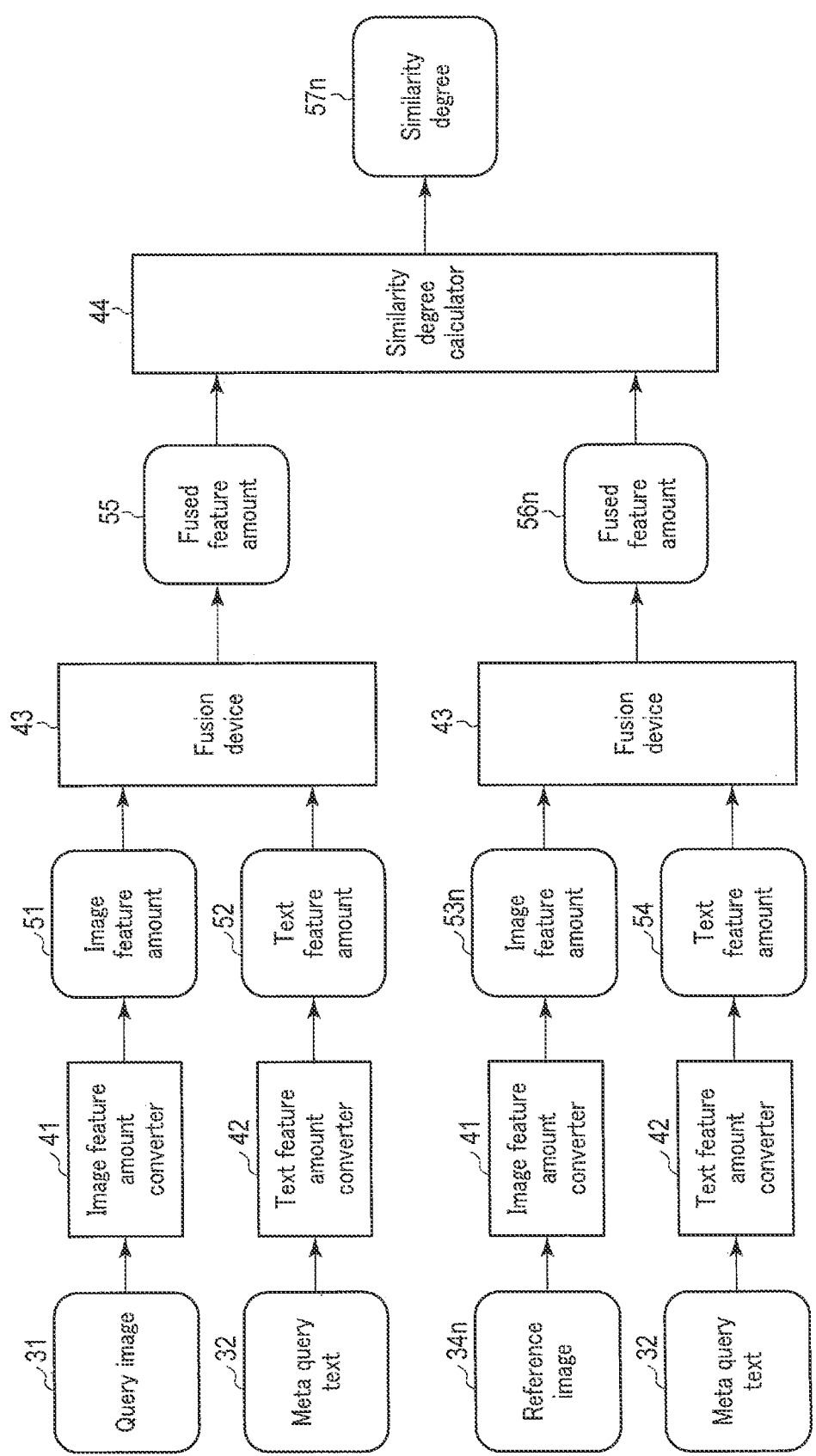
FIG. 4 is a block diagram showing a process of calculating a similarity degree according to this embodiment.
Figure 5:
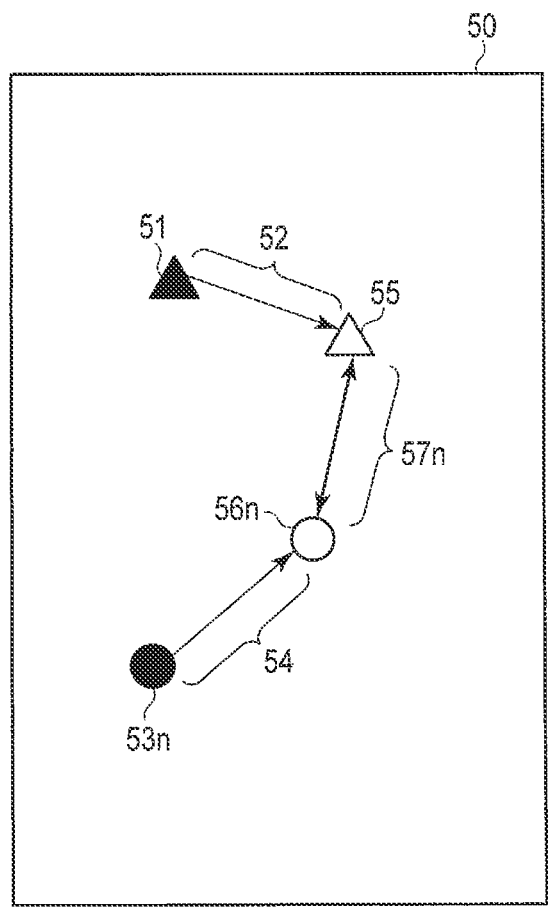
FIG. 5 is a view showing a concept of a similarity degree in a feature amount space.

FIG. 4 is a block diagram showing a process of calculating a similarity degree 57$n$. FIG. 5 shows a concept of a similarity degree in a feature amount space 50. An image feature amount converter 41, a text feature amount converter 42, a fusion device 43, and a similarity degree calculator 44 shown in FIG. 4 are the constituent elements of the similarity degree calculation unit 113. As shown in FIG. 4, the image feature amount converter 41 converts the query image 31 into an image feature amount 51 by projecting the image onto the feature amount space 50 using an encoder or the like. As this encoder, an encoder network using a CNN (Convolutional Neural Network) trained to convert an image into a feature amount is used. The text feature amount converter 42 converts the meta query text 32 into a text feature amount 52 by projecting the meta query text 32 onto the feature amount space 50 using an encoder or the like. As this encoder, an encoder network (language model) using an LSTM (Long Short-Term Memory) trained to converter a text into a feature amount may be used. The fusion device 43 then generates a fused feature amount 55 by fusing the image feature amount 51 based on the query image 31 with the text feature amount 52 based on a meta query text. The fused feature amount 55 is an example of the first feature amount. As the fusion device 43, for example, a neural network using MLP (Multi Layer Perceptron) trained to convert a combination of an image feature amount and a text feature amount into a feature amount may be used.

Likewise, the image feature amount converter 41 converts the reference image 34$n$ into an image feature amount 53$n$ by projecting the reference image 34$n$ onto the feature amount space 50. The text feature amount converter 42 converts the meta query text 32 into a text feature amount 54 by projecting the meta query text 32 onto the feature amount space 50. Note that the text feature amount 52 may be used as the text feature amount 54. The fusion device 43 generates a fused feature amount 56$n$ by fusing the image feature amount 53$n$ based on the reference image 34$n$ with the text feature amount 52 based on a meta query text. The fused feature amount 56$n$ is an example of the second feature amount. The image feature amount 51, the text feature amount 52, the image feature amount 53$n$, and the text feature amount 54 are defined in the same feature amount space.

The similarity degree calculator 44 calculates the distance between the fused feature amount 55 and the fused feature amount 56$n$ as a similarity degree 57$n$. As the similarity degree 57$n$, a cosine similarity degree may be used. The similarity degree 57$n$ is used as the similarity degree between the query image 31 and the reference image 34$n$ based on the viewpoint of a meta query text. Note that the similarity degree 57$n$ is not limited to a cosine similarity degree, and any index that expresses the distance between the fused feature amount 55 and the fused feature amount 56$n$ can be used. For example, the difference value between the fused feature amount 55 and the fused feature amount 56$n$ may be used.

The similarity degree calculation unit 113 calculates the similarity degree 57$n$ between the query image 31 and the reference image 34$n$ by performing the processing shown in FIG. 4 with respect to all the reference images 34$n$. The reference images 34$n$ and the similarity degrees 57$n$ are stored in a reference case database 53 in association with each other.

The calculation of the text feature amount 52 by the text feature amount converter 42 will be described in detail below. As described above, the meta query text 32 is a description expressing the relationship between a plurality of targets. As the text feature amount 52, for example, the value obtained by vectorizing a text using a technique enabling the embedding of a text, such as Word2vec, may be used. This allows the text feature amount 52 to quantify such a relationship. In other words, the text feature amount converter 42 has a function of extracting the relationship between the targets described by the meta query text 32.

The text feature amount 52 may be any value that quantizes the relationship between a plurality of targets, and a method of calculating the value is not limited to the above method. This method is not limited to a calculation method using the above language model. For example, the text feature amount converter 42 may calculate the text feature amount 52 by performing dependency analysis on the meta query text 32. More specifically, the text feature amount converter 42 segments a natural language sentence included in the meta query text 32 into phrases and specifies dependencies as the relationships between the phrases. As dependencies, for example, the relationships between a subject, predicate, object, adjective, adverb, and the like are specified. More precise relationship may be specified. All the dependencies included in the meta query text 32 are joined to convert the meta query text 32 into one text feature amount 52. For another example, the text feature amount converter 42 may perform text analysis on the meta query text 32 to convert it into a knowledge graph and then convert the knowledge graph into the text feature amount 52. A knowledge graph is a directed graph expressing the dependencies between entities in the form of edges, with each phrase included in the meta query text 32 being an entity. A knowledge graph itself may be used as the text feature amount 52. Alternatively, a feature amount obtained by applying a GCN (Graph Convolution Network) to the knowledge graph may be used as the text feature amount 52.

When step S203 is executed, the query unit 114 queries a similar reference image similar to the query image 31 concerning the meta query text 32 based on the similarity degree calculated in step S203 (step S204). More specifically, the query unit 114 compares a threshold with the similarity degree 57n associated with each reference image 34n to extract the reference image 34n associated with a similarity degree equal to or more than the threshold as a similar reference image from the reference case database 33. The threshold may be set to an arbitrary value by the user or the like via the input device 13.

When step S204 is executed, the presentation unit 115 presents the query result obtained in step S204 (step S205). When a similar reference image is extracted in step S204, the presentation unit 115 displays the similar reference image on the display device 15 in step S205. In the case of FIG. 3, if the similarity degree of a reference image 341 is relatively high and equal to or more than the threshold, the reference image 341 is displayed as a similar reference image on the display device 15. For confirmation, the similarity degree between the query image and the similar reference image may be displayed.

The reference image 341 is expected to be an image similar to the query image 31 from the viewpoint of the meta query text 32. More specifically, the reference image 341 is expected to be an image concerning the case of "The person wears gloves on his hands" and "The person is in a room" like the query image 31. As described above, according to this embodiment, it is possible to display the similar reference image 341 similar to the query image 31 from the viewpoint of the meta query text 32 describing the viewpoint to be noted by the user or the like.

As described above, the meta query text 32 can be designated in the form of a natural language sentence describing the relationship between targets depicted in the query image 31. This makes it possible to sublimate a context such as a detailed correlation (interaction) between the targets or a surrounding environment (situation) into a text feature amount, fused feature amount, similarity degree, or the like, thereby enabling a query for a similar case at the context level. This improves the degree of freedom in query. More specifically, it is possible to query a similar image in similar image querying under detailed conditions such as whether the person holds the gloves "in his hands", "puts the gloves on the table", or "wears the gloves" in addition to whether "the person" and "the gloves" are depicted in the same image (co-occurrence).

The above case query processing can be applied to any kinds of cases including a disaster, accident, failure and/or incident. For example, this processing can also be applied to disaster case query and near miss case. In disaster case query, when an accident has occurred in a site, an image (to be referred to as a monitoring camera image hereinafter) captured by a monitoring camera in the disaster site is set as a query condition, and a disaster case similar to the query condition which occurred in the past is retrieved as a similar reference case. This makes it possible to immediately check a disaster situation at the time, executed countermeasures, and the like. More specifically, it is possible to comprehend emergency countermeasures or a repair procedure by querying a past similar failure case from data such as an image of a broken or faulty machine, a text, and an abnormal sound.

In near miss detection, even in a site where no disaster has actually occurred, a monitoring camera image acquired from a monitoring camera or the like is set as a query condition, and a disaster case similar to the query condition is periodically retrieved and analyzed as a similar reference case. This can detect a dangerous state in which a disaster is likely to occur, and hence can use the detection for prevention. More specifically, when periodic query under a monitoring camera image on site as a query condition has retrieved an accident case caused by neglect of protection of the hands as a result of similarity query, the query result can be used to raise awareness considering that the worker on site is likely not to wear any gloves.

The presentation unit 115 may display the query image 31 and/or the meta query text 32 together with the similar reference image 341 for confirmation by the user. The query image 31 and/or the meta query text 32 can be observed and analyzed as a determination basis for similarity query.

If no similar reference image is extracted in step S204, no similar reference image is displayed on the display device 15. In this case, the presentation unit 115 may display a message on the display device 15 informing that there is no similar reference image, such as "No similar reference image was found", and output a sound indicating the situation or a warning sound from a loudspeaker or the like.

When step S205 is executed, the case query processing is terminated.

According to the above embodiment, the case query apparatus 1 includes the query condition acquisition unit 111, the meta query condition acquisition unit 112, the similarity degree calculation unit 113, the query unit 114, and the presentation unit 115. The query condition acquisition unit 111 acquires a query condition that is data of a case as a query target. The meta query condition acquisition unit 112 acquires a meta query condition that is a description concerning a viewpoint to focus on in querying a case similar to a query condition. The similarity degree calculation unit 113 calculates the similarity degree between a query condition and each of a plurality of reference cases that are data of a case as a query target. The query unit 114 queries a similar reference image similar to a query condition from the viewpoint of a meta query condition, among a plurality of reference cases, based on similarity degrees. The presentation unit 115 presents the query result obtained by the query unit 114.

According to the above arrangement, when a text describing, in a natural language sentence form, the relationship between a plurality of targets to be noted, which is included in a query condition, is input as a meta query condition, a similar case concerning a complex context such as the relationship can be retrieved. This raises expectation to improvement in the degree of freedom in query.

Note that the above case query processing can be variously modified without departing from the gist of the processing.

For example, step S201 and step S202 may be interchanged.

For another example, in step S202, a meta query condition may be registered in the processing circuit 11, the storage device 12, or the like in advance. More specifically, a user such as an administrator preferably registers a text describing the viewpoint to be checked as a default meta query text in advance and store it, together with a reference image, in a reference case database in advance. In addition, in this case, at a stage before calculating the image feature amount of a query image, each reference image may be converted into an image feature amount, and the meta query text may be concurrently converted into a text feature amount. Each fused feature amount may then be calculated based on each image feature amount and each text feature amount. Each reference image and a corresponding fused feature amount may be stored in a reference case database in association with each other. This can omit the calculation processing of a fused feature amount concerning each reference image when querying a reference image similar to the default meta query text, thereby enabling reduction in processing time. Note that there is no need to calculate all fused feature amounts, and fused feature amounts may be interpolated based on adjacent fused feature amounts.

A plurality of default meta query texts may be generated, and a fused feature amount and a reference image may be stored in the storage device 12 in advance in association with each other for each default meta query text. In querying a similar reference image, the user may select one of the plurality of meta query texts in which the user is interested via the input device 13.

Application Example 1

A similarity degree in the above embodiment is the distance between the first feature amount based on a combination of a query condition and a meta query condition and the second feature amount based on a combination of a reference case and the meta query condition. Assume that a similarity degree according to application example 1 is the matching rate between the first status corresponding to a meta query condition concerning a query condition and the second status corresponding to a meta query condition concerning a reference case. A case query apparatus according to application example 1 will be described below.

The similarity degree calculation unit 113 according to application example 1 calculates, as a similarity degree, the matching rate between the first status corresponding to a meta query condition of a query condition and the second status corresponding to the meta query condition of a reference case. Assume that a meta query condition according to application example 1 is a questioning sentence describing, in a question form, a viewpoint to focus on in querying a case similar to a query condition. In this case, the similarity degree calculation unit 113 estimates the first answer to the questioning sentence of the query condition as the first status and estimates the second answer to the questioning sentence of the reference case as the second status.

Figure 6:
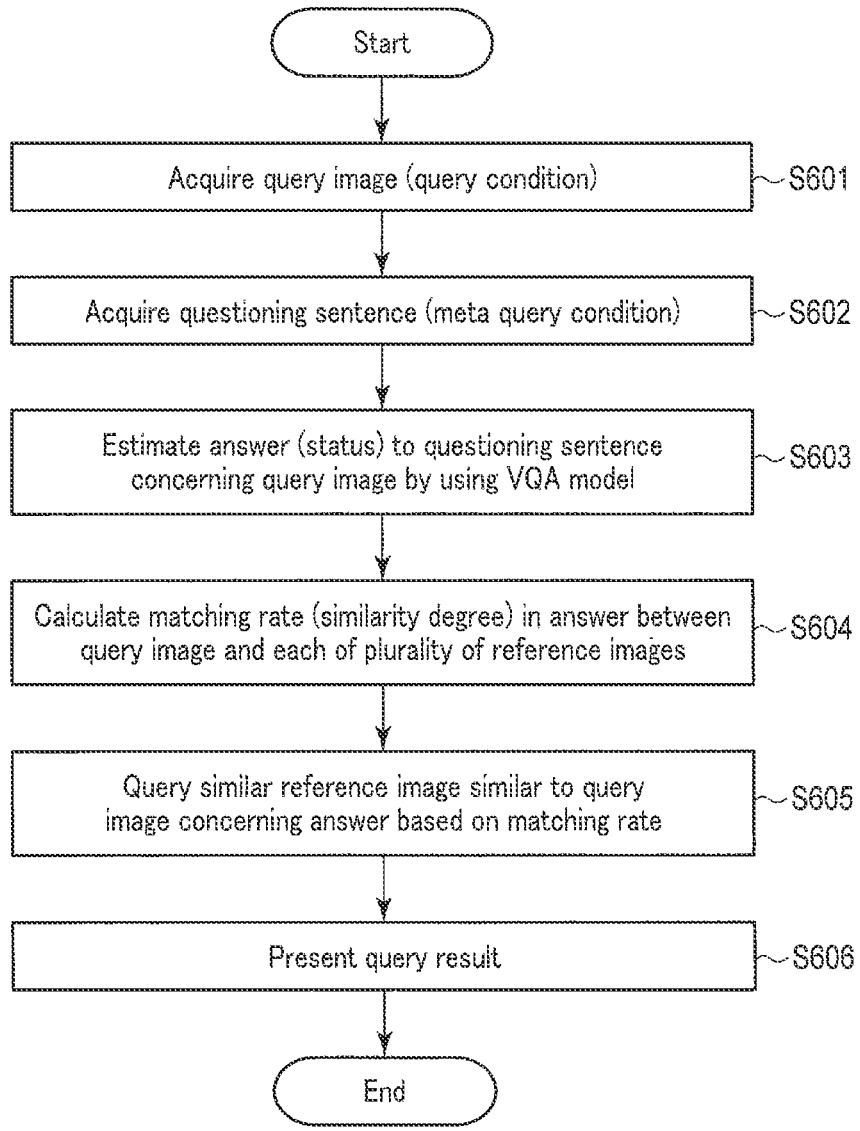
FIG. 6 is a flowchart showing a procedure of an example of case query processing by a case query apparatus according to application example 1.

FIG. 6 is a flowchart showing a procedure of an example of case query processing by the case query apparatus 1 according to application example 1. FIG. 7 is a view showing an outline of the case query processing shown in FIG. 6. Assume that in the following description, data media of a query and a reference case are respectively a query image and a reference image as in the above embodiment.

As shown in FIGS. 6 and 7, the query condition acquisition unit 111 acquires a query image (query condition) 71 (step S601). Assume that in this embodiment, the query image 71 is a still image depicting the worker on site is working on the stairs.

When step S601 is executed, the meta query condition acquisition unit 112 acquires a questioning sentence (meta query condition) 72 (step S602). The questioning sentence 72 is a text describing, in a questioning sentence form, the relationship between a plurality of targets depicted in the query image 71 based on the viewpoint to be noted by the user among the targets depicted in the query image 71. Targets to be noted may be objects such as persons or articles and non-objects such as stairs, hallways, ceilings, roads, and skies. The relationship between targets may be any of the following: the relationship between objects, the relationship between non-objects, and the relationship between an object and a non-object. The questioning sentence 72 may be a natural language sentence that can describe a relationship. The questioning sentence 72 may include one question expressing a relationship or two or more questions.

The questioning sentence 72 according to this embodiment includes three questions, namely, 1. "Is there any person on the stairs?", 2. "Does the person carry an object?", and 3. "Does the person wear gloves on his hands?". The first question expresses the relationship between the object "person" and the non-object "stairs", that is, the relationship between the object and the non-object. The second question expresses the relationship between the object "person" and the object "article", that is, the relationship between the object and the object. The third question expresses the relationship between the object "hands" and the object "gloves", that is, the relationship between the object and the object. Note that the questioning sentence 72 may not be limited to a natural language sentence and may include a noun phrase expressing an attribute of an object, such as "black gloves".

When step S602 is executed, the similarity degree calculation unit 113 estimates an answering sentence (status) 73 to the questioning sentence 72 concerning the query image 71 by using a VQA (Visual Question Answering) model (step S603). A VAQ model is a learned model for estimating an answering sentence to a questioning sentence concerning an image. As a VQA model, the technique disclosed in a reference literature (L. Li et al., "Relation-Aware Graph Attention Network for Visual Question Answering", ICCV2019) may be used. The answering sentence 73 is estimated for each question included in the questioning sentence 72. For example, as shown in FIG. 7, the answering sentence 73 is obtained such that answer 1. "Yes" is estimated for question 1. "Is there any person on the stairs?"; answer 2. "Yes", for question 2. "Is the person carrying an object?"; and answer 3. "No", for question 3. "Does the person wear gloves on his hands?".

When step S603 is executed, the similarity degree calculation unit 113 calculates the matching rate (similarity degree) between the query image 71 acquired in step S601 and an answering sentence 76n of each of a plurality of reference images 75n stored in a reference case database 74 (step S604). Note that "n" represents a natural number indicating the number of each reference image stored in the reference case database 74 and takes a value defined by 1≤n≤N. "N" is a natural number indicating the total number of reference images 75 stored in the reference case database 74 and has a value of 2 or more. The reference case database 74 stores many reference images 75n related to site workers. An answering sentence 76n to the questioning sentence 72 concerning each reference image 75n is stored in association with the reference image 75n.

FIG. 8 is a block diagram showing a process of calculating a matching rate. A VQA model 81 and a matching rate calculator 82 shown in FIG. 8 are constituent elements of the similarity degree calculation unit 113 according to application example 1. The VQA model 81 includes network modules such as an image feature amount converter 811, a text feature amount converter 812, and an answer estimator 813. The image feature amount converter 811 converts the query image 71 into an image feature amount 83. As a method of converting the image feature amount 83, one of various types of methods can be used. Three types of methods will be described below.

The First Image Feature Amount Conversion Method:

The image feature amount converter 811 detects an ROI (Region Of Interest) including a region seemed to be an object by applying an object detection model to the query image 71. The image feature amount converter 811 then calculates the feature amount (to be referred to as the ROI feature amount hereinafter) of the extracted ROI. The image feature amount converter 811 segments the query image 71 into a plurality of image regions by applying a semantic segmentation model to the query image 71. The image feature amount converter 811 calculates a feature amount (to be referred to as a segmentation feature amount hereinafter) concerning semantic segmentation. A fusion method may be performed by, for example, joining vectors respectively expressing an ROI feature amount and a segmentation feature amount.

A method of calculating an ROI feature amount will be described in detail. Assume that in this case, a neural network called Faster R-CNN is used as an object detection model. Note that the method to be used is not limited to Faster R-CNN, and any general object detection model may be used. An object detection model is configured to express a rectangle (bounding box) surrounding an object such as a worker or shelf as an ROI so as to specify a region seemed to be an object. An ROI feature amount is extracted for each ROI. A general object recognition model outputs an object candidate and an identification vector (identification score) as an output from the object recognition model. In this embodiment, a value calculated on the layer immediately preceding the output layer is set as an ROI feature amount. For example, when an identification vector (that is, an 80-dimensional vector) including an identification score concerning 80 object candidates is obtained from the output layer with respect to a processing target ROI, a vector having 80 or more dimensions immediately before the output layer, for example, a vector having 2000 or more dimensions, is processed. In this case, a vector value calculated on the layer immediately preceding the output layer is used as an ROI feature amount. Note that as an ROI feature amount, information concerning a scene graph expressing the positional relationship between objects and the semantic relationship between the objects may be used.

A method of calculating a segmentation feature amount will be described in detail. Assume that in this case, as an example of a semantic segmentation model, a neural network called FCN (Fully Convolutional Networks) is used. Note that any model that is used for semantic segmentation, such as Segnet or U-net, may be used other than FCN. In semantic segmentation, each pixel in an image is labeled. In this embodiment, image regions obtained by segmentation each correspond to each region of an object such as a site worker or machine depicted in the query image 71 or a non-object such as a hallway or roof. A vector value (for example, a 4000-dimensional vector) calculated on the layer immediately preceding the output layer is calculated as a segmentation feature amount concerning the image region with respect to each pixel included in the image region.

The Second Image Feature Amount Conversion Method:

First of all, as in the first image feature amount conversion method, the image feature amount converter 811 detects an ROI including a region seemed to be an object by applying an object detection model to the query image 71. In addition, as in the first image feature amount conversion method, the image feature amount converter 811 segments the query image 71 into a plurality of image regions by applying a semantic segmentation model to the query image 71. The image feature amount converter 811 then generates a fused ROI by fusing an ROI concerning the same target and an image region. For example, the sum of an ROI and an image region is a fused ROI. Note that the image feature amount converter 811 may decrease the threshold for the recognition of an ROI in ROI detection processing to detect more ROIs than normal and generate an ROI whose overlapping region between a detected ROI and an image region is equal to or more than a threshold as a fused ROI. The image feature amount converter 811 then calculates the image feature amount 83 for each fused ROI by a technique similar to the first image feature amount conversion method. An image feature amount may be calculated for each fused ROI by a method similar to that for an image feature amount using an object detection model.

The Third Image Feature Amount Conversion Method:

First of all, as in the first image feature amount conversion method, the image feature amount converter 811 calculates an ROI feature amount and a segmentation feature amount and calculates the image feature amount 83 as a fused feature amount. The image feature amount converter 811 segments the query image 71 into a plurality of image regions by applying a semantic segmentation model to the query image 71. The image feature amount converter 811 then extracts a semantic label for each image region. A semantic label is a label attached to each image region. The image feature amount converter 811 encodes each semantic label. For example, the image feature amount converter 811 may encode each semantic label by using Word2vec. The image feature amount converter 811 calculates the image feature amount 83 by joining a fused feature amount and an encoded semantic label. For example, the image feature amount converter 811 may join the vector of the encoded sematic label to the vector of the fused feature amount.

According to the first to third image feature amount conversion processes described above, each query image can be converted into the image feature amount 83 upon accurate recognition of both an object and a non-object as image feature amounts. Note that the first to third image feature amount conversion processes can also be used for the calculation of the image feature amounts 51 and 53$n$ shown in FIG. 4.

As shown in FIG. 8, the text feature amount converter 812 converts the questioning sentence 72 into a text feature amount 84. As the text feature amount 84, for example, the value obtained by vectorizing a text using a technique that can implement distribution representation of a text, such as Word2vec. The answer estimator 813 estimates the answering sentence 73 based on the image feature amount 83 and the text feature amount 84. For example, the answer estimator 813 uses a learned model for VQA using DNN or the like using Attention to estimate the answering sentence 76$n$ by using an image feature amount 85$n$ and a text feature amount 86.

Likewise, the image feature amount converter 811 converts the reference image 75$n$ into the image feature amount 85$n$. The text feature amount converter 812 converts the questioning sentence 72 into the text feature amount 86. The answer estimator 813 estimates the answering sentence 76$n$ based on the image feature amount 85$n$ and the text feature amount 86.

The matching rate calculator 82 calculates a matching rate 77$n$ between the answering sentence 73 and the answering sentence 76$n$ as a similarity degree. The matching rate 77$n$ indicates the degree of match between the answer patterns included in the answering sentence 73. The matching rate 77$n$ has a larger value with an increase in the number of answers indicating matches, and vice versa. More specifically, the answer estimator 813 calculates a prediction score concerning the word choice "Yes" and a prediction score concerning the word choice "No" and outputs the word choice with the higher prediction score as an answer. A prediction score is a network output concerning a class separation task and corresponds to a likelihood. The matching rate calculator 82 performs binary determination to determine whether an answer to the query image 71 matches an answer to the reference image 75n for each question included in the questioning sentence 72 and counts the number of matches. The matching rate calculator 82 calculates the rate of the number of matches to the number of questions included in the questioning sentence 72 as the matching rate 77n. For example, as shown in FIG. 7, the answering sentence 73 concerning the query image 71 and an answering sentence 761 concerning a reference image 751 match each other in all the three answers, and hence the matching rate is high, whereas the answering sentence 73 concerning the query image 71 and an answering sentence 76N concerning a reference image 75N match in two answers, and hence the matching rate is intermediate.

The similarity degree calculation unit 113 performs the processing shown in FIG. 8 with respect to all the reference images 75n to calculate the matching rate 77n between the query image 71 and the reference image 75n. The reference image 75n and the matching rate 77n are stored in the reference case database 74 in association with each other.

When step S604 is executed, the query unit 114 queries a similar reference image similar to the query image 71 concerning the answering sentence 73, based on the matching rate calculated in step S604 (step S605). More specifically, the query unit 114 compares a threshold with the matching rate 77n associated with each reference image 75n and extracts the reference image 75n associated with a matching rate equal to or more than the threshold as a similar reference image from the reference case database 74. The threshold may be set to an arbitrary value by the user or the like via the input device 13.

When step S605 is executed, the presentation unit 115 presents the query result obtained in step S605 (step S606). When a similar reference image is extracted in step S605, the presentation unit 115 displays the similar reference image on the display device 15 in step S606. For example, in the case of FIG. 7, if the matching rate of the reference image 751 is relatively high and equal to or more than the threshold, the reference image 751 is displayed as a similar reference image on the display device 15.

Figure 9:
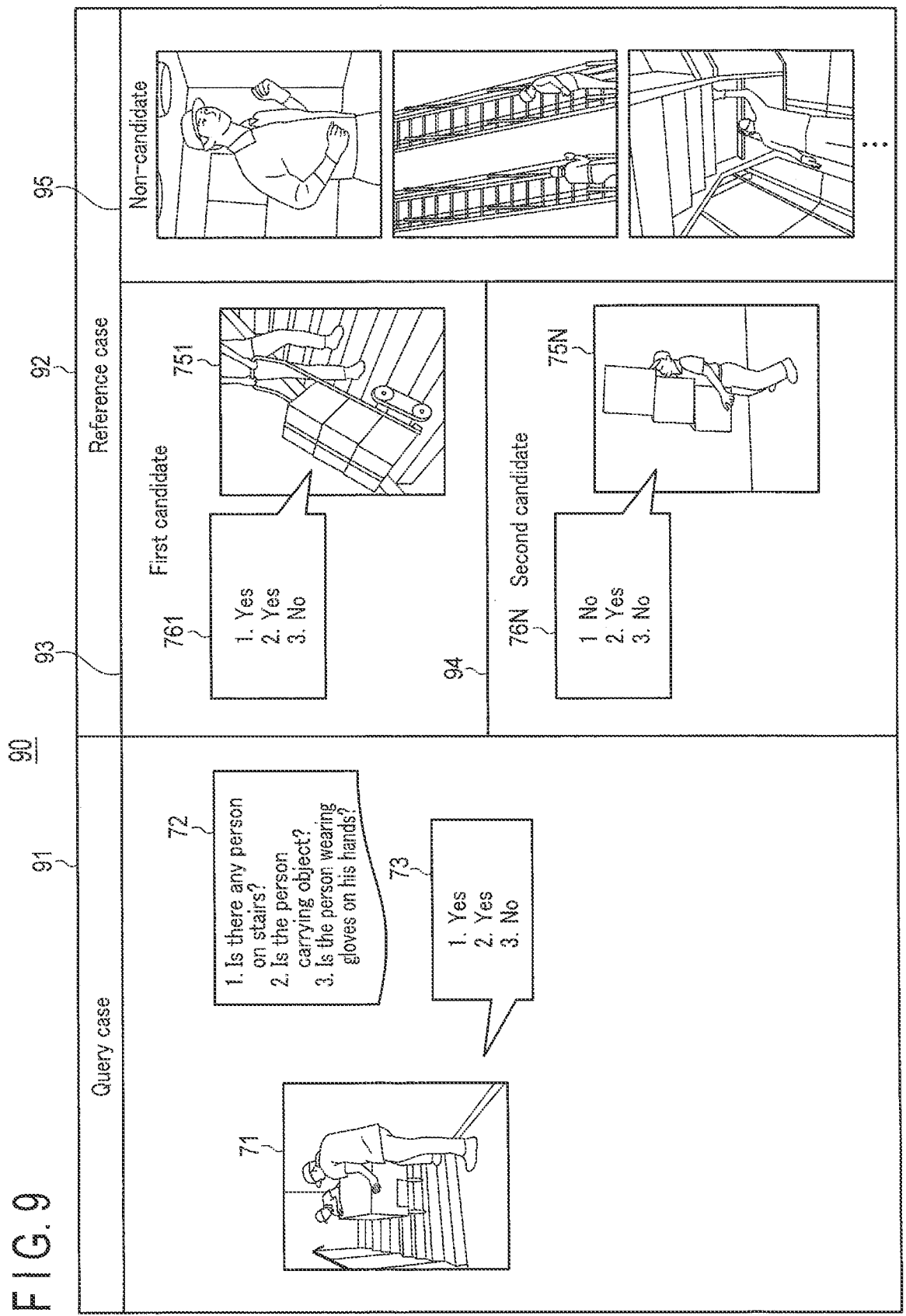
FIG. 9 is a view showing an example of a query result display screen according to application example 1.

FIG. 9 is a view showing an example of a query result display screen 90. As shown in FIG. 9, the display screen 90 is divided into a query case display region 91 and a reference case display region 92. The display region 92 displays, for example, the query image 71, the questioning sentence 72, and the answering sentence 73. The display region 92 displays, for example, a first candidate display region 93, a second candidate display region 94, and a non-candidate display region 95. The display region 93 displays the reference image (similar reference image) 751, of the reference images extracted as similar reference images in step S605, which exhibits the highest matching rate and the answering sentence 761 concerning the reference image (similar reference image) 751 so as to visually associate them with each other. The display region 94 displays the reference image 75N, of the reference images extracted as similar reference images in step S605, which exhibits the second highest matching rate and the answering sentence 76N concerning the reference image 75N so as to visually associate them with each other. The display region 95 displays the reference image 75n other than the first and second candidates.

As shown in FIG. 9, according to application example 1, since the reference image 75n similar to the query image 71 concerning the answering sentence 73 to the questioning sentence 72 is presented, the user can efficiently obverse the similar reference image 75n. Since the similar reference image 75n and the corresponding answering sentence 76n are displayed together so as be visually associated with each other, the user can also check the answering sentence 76n. Since the query image 71 and the corresponding answering sentence 73 are displayed, the user can inspect the degree of match (the degree of similarity) of the similar reference image 75n by visually comparing the answering sentence 73 and the answering sentence 76n. That is, the answering sentence 76n is expected to be used as a basis for similar case querying.

The presentation unit 115 displays the answering sentence 76n with a visual effect corresponding to the degree of match. For example, the presentation unit 115 may highlight the answering sentence 76n concerning the similar reference image 75n and having an answering pattern matching the answering sentence 73 concerning the query image 71. This makes it possible to easily identify the answering sentence 76n exhibiting a high matching rate and the corresponding similar reference image 75n. Alternatively, the presentation unit 115 may display the answering sentences 76n in different colors in accordance with the matching rates in order to visualize the matching rates. For example, the presentation unit 115 may display the answering sentence 761 whose all answers exhibit matches in blue, display the answering sentence 76N whose two answers exhibit differences in red, and the answering sentence 76N whose all answers exhibit differences in gray or the like. In addition, the presentation unit 115 may visually emphasizes the similar reference image 75n in accordance with the matching rate in order to visualize matching rates. For example, the presentation unit 115 may blink the similar reference image 75n corresponding to the answering sentence 76n whose all answers exhibit matches, display it with a frame, or display it in size larger than other similar reference images 75n.

In this case, the presentation unit 115 may filter the similar reference image 75 extracted in step S605 with the questions or answers designated by the user. For example, the questions and answers of the questioning sentence 72, the answering sentence 73, and the answering sentence 76n shown in FIG. 9 each are displayed in a GUI (Graphical User Interface) form so as to be selectable. When an answer of the answering sentence 73 in which the user is interested is designated via the input device 13, the presentation unit 115 extracts the similar reference image 75n having an answer matching the designated answer from the similar reference images 75n extracted in step S605 and displays the extracted similar reference image 75n.

Figure 10:
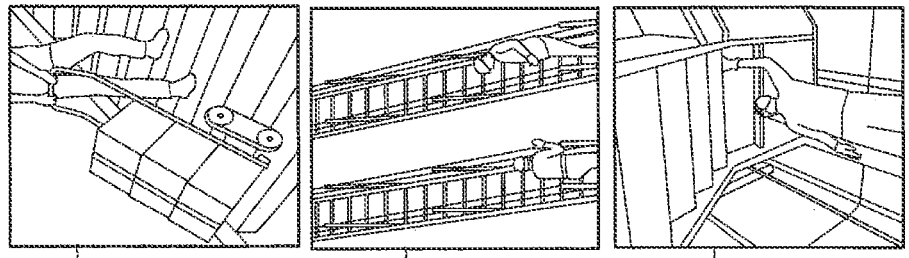
FIG. 10 is a view showing an example of a filtering result display screen according to application example 1.
Figure 10:
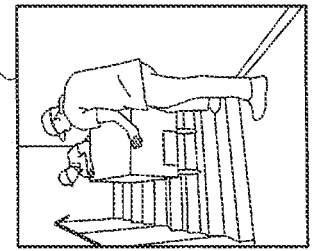

FIG. 10 is a view showing an example of a filtering result display screen 100. As shown in FIG. 10, when a first answer 101 of the answering sentence 73 concerning the query image 71 is selected, the presentation unit 115 extracts a similar reference image 102n having an answer matching the answer 101 from the similar reference images extracted in step S605 and displays the extracted image in the reference case display region 92. At this time, the presentation unit 115 displays an answering sentence 103n concerning the similar reference image 102n so as to visually associate them with each other. As shown in FIG. 10, since the first answer 101 of the answering sentence 73 which is selected is "Yes", the similar reference image 102n corresponding to the first answer "Yes" is extracted. Any answer of the answering sentence 103n which is irrelevant to filtering is preferably masked. Filtering makes it possible to easily query and display the similar reference image 102n having an answer in which the user is interested.

Note that the presentation unit 115 may perform filtering by selecting the questioning sentence 72 instead of the answering sentence 73 concerning the query image 71. More specifically, when a question of the questioning sentence 72 in which the user is interested is designated via the input device 13, the presentation unit 115 extracts the similar reference image 75n having an answer matching an answer concerning the query image 71 which corresponds to the designated question from the similar reference images 75n extracted in step S605 and displays the extracted similar reference image 75n.

When step S606 is executed, the case query processing according to application example 1 is terminated.

Note that the above case query processing can be variously modified without departing from the gist of the processing.

For example, step S601 and step S602 may be interchanged.

For another example, in step S602, a questioning sentence may be registered in the processing circuit 11, the storage device 12, or the like in advance. More specifically, a user such as an administrator preferably registers a questioning sentence describing the viewpoint to be checked as a default questioning sentence in advance and store it in a reference case database in advance. In this case, at a stage before estimating an answer concerning a query image, an answering sentence corresponding to a default questioning sentence concerning each reference image is estimated, and the reference image and the answering sentence may be stored in the reference case database in association with each other. This makes it possible to omit the processing of estimating an answering sentence concerning a reference image when querying a similar reference image with a default questioning sentence, and hence can shorten the processing time.

A plurality of default questioning sentences may be generated, and an answering sentence may be stored for each default questioning sentence in the storage device 12 in advance in association with a reference image. In querying a similar reference image, the user may select one of a plurality of questioning sentences in which he/she is interested from a plurality of questioning sentences via the input device 13.

Application Example 2

The VQA model according to application example 1 can also be applied to moving images. A case query apparatus 1 according to application example 2 uses moving images as a query condition and a reference case and uses a questioning sentence as a meta query condition. A similarity degree calculation unit 113 according to application example 2 uses a VideoQA model (for example, J. Lei et al., "TVQA: Localized, Compositional Video Question Answering", EMNLP2018) and estimates an answering sentence to a questioning sentence concerning a query condition and a reference case with respect the relationship extracted from the questioning sentence. Subsequently, the similarity degree calculation unit 113 may calculate a matching rate (similarity degree) based on an answering sentence concerning the query condition and an answering sentence concerning the reference case.

Application Example 3

A meta query condition acquisition unit 112 according to application example 3 automatically generates meta query condition. Meta query condition may be generated by using query condition and/or reference case. For example, when image is handled as query condition and reference case, the reference technique (S. Zhang et al., "Automatic Generation of Grounded Visual Questions", IJCAI2017) of generating questioning sentences from query images may be used. Alternatively, a meta query condition generation method using statistical amounts by, for example, replacing a word with a high appearance frequency, which is extracted from text data in a reference case by using morphological analysis and syntax analysis, by part of a prepared fixed phrase.

Application Example 4

A case query apparatus according to application example 4 performs person tacking from a monitoring camera image by using the case query processing according to application example 2 and application example 3 described above. The case query apparatus according to application example 4 will be described below.

Figure 11:
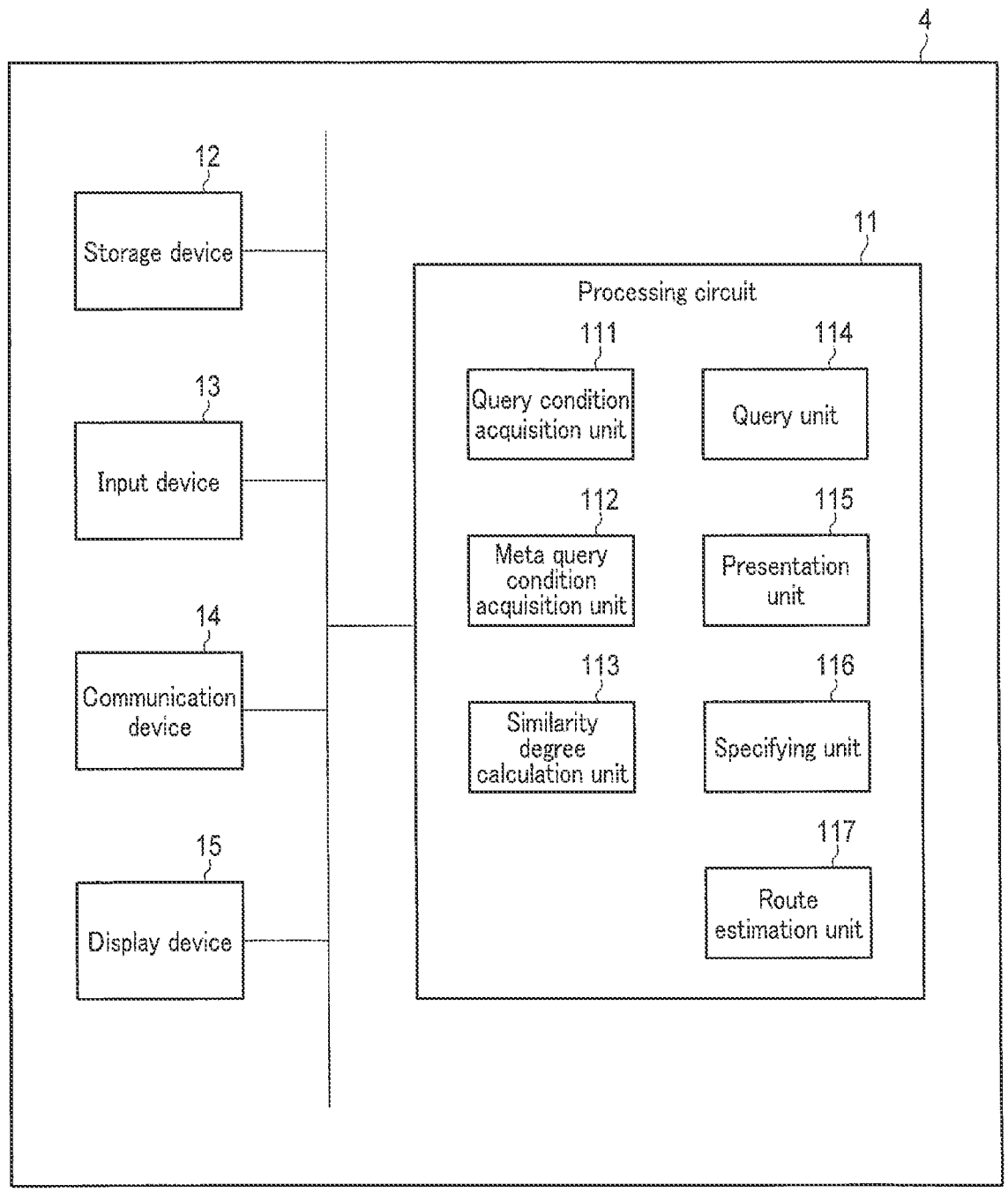
FIG. 11 is a block diagram showing an example of the arrangement of a case query apparatus according to application example 4.

FIG. 11 is a block diagram showing an example of the arrangement of a case query apparatus 4 according to application example 4. As shown in FIG. 11, the case query apparatus 4 is a computer including a processing circuit 11, a storage device 12, an input device 13, a communication device 14, and a display device 15. The processing circuit 11 includes a specifying unit 116 and a route estimation unit 117 in addition to a query condition acquisition unit 111, a meta query condition acquisition unit 112, a similarity degree calculation unit 113, a query unit 114, and a presentation unit 115. The processing circuit 11 implements the functions of the units 111 to 117 described above by executing a person tracking program. The person tracking program is stored in a non-transitory computer-readable recording medium such as the storage device 12. The person tracking program may be implemented as a single program describing all the functions of the units 111 to 117 or may be implemented as a plurality of modules divided into several function units. Alternatively, the units 111 to 117 each may be implemented by an integrated circuit such as an ASIC. In this case, the respective units may be implemented in a single integrated circuit or may be individually integrated in a plurality of integrated circuits.

Figure 12:
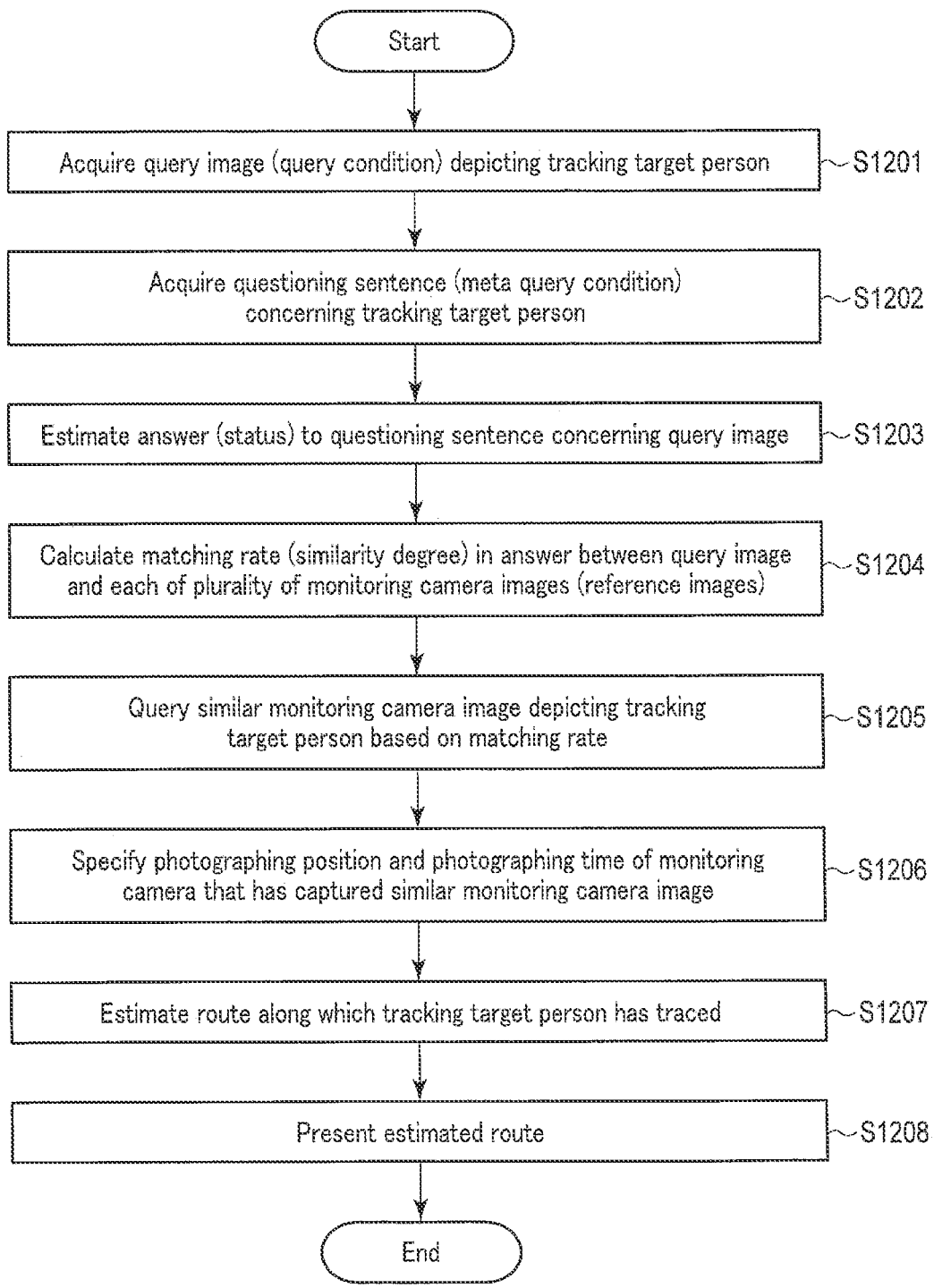
FIG. 12 is a flowchart showing a procedure for an example of person tracking processing by the case query apparatus according to application example 4.

FIG. 12 is a flowchart showing a procedure for an example of person tracking processing by the case query apparatus 4 according to application example 4. FIG. 13 is a view showing an outline of the person tracking processing shown in FIG. 12.

As shown in FIGS. 12 and 13, the query condition acquisition unit 111 acquires a query image (query condition) 131 depicting a tracking target person (step S1201). Assume that in this embodiment, the query image 131 is an image which is captured by an arbitrary optical camera or the like and in which a tracking target person is depicted. The query image 131 may be a partially still image of a monitoring camera image captured by a monitoring camera.

When step S1201 is executed, the meta query condition acquisition unit 112 acquires a questioning sentence (meta query condition) 132 (step S1202). The questioning sentence 132 is a text describing, in a question form, the relationship between the tracking target person depicted in the query image 131 and the clothes, accessories, and belongings.

Assume that the questioning sentence 132 according to this embodiment includes three questions, namely, 1. "Does the person wear a red shirt?", 2. "Does the person wear a cap?", and 3. "Does the person carry a brown bag?".

When step S1202 is executed, the similarity degree calculation unit 113 estimates an answer (status) 133 to the questioning sentence 132 concerning the query image 131 by using a VQA model or VideoQA (step S1203). The answering sentence 133 is estimated for each question included in the questioning sentence 132. For example, as shown in FIG. 12, the answering sentence 133 is obtained such that answer 1. "Yes" is estimated for question 1. "Does the person wear a red shirt?"; answer 2. "Yes", for question 2. "Does the person wear a cap?"; and answer 3. "Yes", for question 3. "Does the person carry a brown bag?".

When step S1203 is executed, the similarity degree calculation unit 113 calculates the matching rate (similarity degree) between a query image 71 acquired in step S1201 and an answering sentence 136n concerning each of a plurality of monitoring camera images 135n stored in a reference case database 134 (step S1204). Note that "n" represents a natural number indicating the number of each monitoring camera image stored in the reference case database 134 and takes a value defined by 1≤n≤5 N. "N" is a natural number indicating the total number of monitoring camera images 135 stored in the reference case database 134 and has a value of 2 or more. The reference case database 134 stores many monitoring camera images 135n. The installation position (to be referred to as the photographing position hereinafter) and photographing time of the monitoring camera that has captured the monitoring camera image are associated with each monitoring camera image. In addition, the answering sentence 136n to the questioning sentence 132 concerning each monitoring camera image 135n are stored in association with the monitoring camera image 135n. Assume that the similarity degree calculation unit 113 or the like has estimated the answering sentence 136n from the monitoring camera image 135n and the questioning sentence 132 by using a VQA model or VideoQA.

When step S1204 is executed, the query unit 114 queries a monitoring camera image (to be referred to as a similar monitoring camera image hereinafter) depicting a tracking target person based on the matching rate calculated in step S1204 (step S1205). More specifically, the query unit 114 compares a threshold with the matching rate associated with each monitoring camera image 135n and extracts the monitoring camera image 135n associated with a matching rate equal to or more than the threshold as a similar monitoring camera image from the reference case database 134. The threshold may be set to an arbitrary value by the user or the like via the input device 13.

When step S1305 is executed, the specifying unit 116 specifies the photographing position and a photographing time 137n of the monitoring camera image 135n extracted in step S1305 (step S1206). The photographing position may be the address of the installation position of the monitoring camera or an identifier linked to the address.

When step S1206 is executed, the route estimation unit 117 estimates a route (to be referred as an estimated route hereinafter) 138 along which the tracking target person has traced based on the photographing position and the photographing time 137n specified in step S1206 (step S1207). An arbitrary estimation method may be used for the estimated route 138. For example, the route estimation unit 117 generates the estimated route 138 by connecting the photographing positions of the monitoring camera image 135n in the order of photographing times.

When step S1207 is executed, the presentation unit 115 presents the estimated route 138 obtained in step S1207 (step S1208). In step S1208, the presentation unit 115 displays the estimated route 138 on the display device 15.

Figure 14:
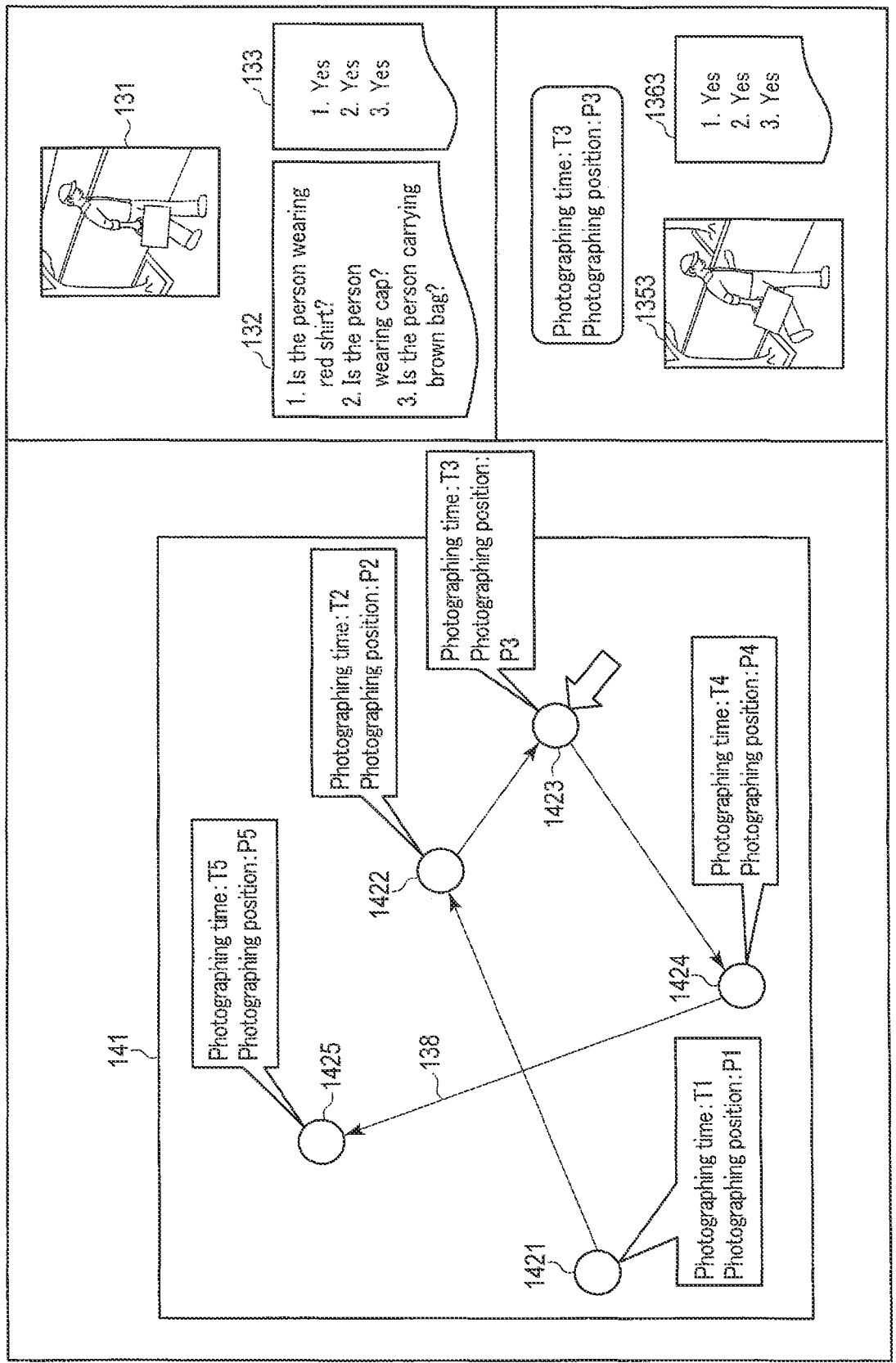
FIG. 14 is a view showing an example of an estimated route display screen according to application example 4.

FIG. 14 is a view showing an example of a display screen 140 for the estimated route 138. As shown in FIG. 14, a map image 141 depicting the estimated route 138 concerning the tracking target person is displayed on the display screen 140. The presentation unit 115 generates the map image 141. More specifically, the map image 141 is generated in the following procedure. First of all, the presentation unit 115 reads out map data including the photographing position of the monitoring camera image 135n, plots marks 142n at the photographing positions of the monitoring camera images 135n on the map data, and draws the line connecting the marks 142 in the order of photographing times on the map data as the estimated route 138. The presentation unit 115 then cuts out an arbitrary range of the map data on which the marks 142n and the estimated route 138 are depicted as the map image 141. Displaying the map image 141 allows the user to easily check the route along which the tracking target person is estimated to trace. Note that if the route of the tracking target person between the marks 142n can be estimated, the presentation unit 115 may draw the paths between the marks 142n with an arbitrary line such as a straight line or curve tracing the route.

As shown in FIG. 14, the photographing time and the photographing position corresponding to the mark 142n may be displayed adjacent to the mark 142n so as to allow the user to check them. In addition, the query image 131, the questioning sentence 132, and the answering sentence 133 may be displayed on the display screen 140 so as to allow the user to check them. Furthermore, the presentation unit 115 may display a combination of an arbitrary monitoring camera image, an answering sentence, a photographing time, and a photographing position so as to allow the user to check them. For example, as shown in FIG. 14, when a mark 1423 is designated, a monitoring camera image 1353, an answering sentence 1363, a photographing time T3, and a photographing position P3 which correspond to the mark 1423 are displayed.

When step S1208 is executed, the person tracking processing according to application example 4 is terminated.

Note that the above case query processing can be variously modified without departing from the gist of the processing.

For example, step S1201 and step S1202 may be interchanged. As in application example 1, in step S1202, questioning sentences may be registered in advance as default questioning sentences in the processing circuit 11, the storage device 12, or the like.

For another example, tracking targets are not limited to persons, and the present invention can also be applied to living beings including animals, insects, and fishes and moving objects including robots, vehicles, flight vehicles, and ships.

Application Example 5

In the respective embodiments, the data medium in reference cases as non-query targets is one of the following types: image, moving image, text, speech, and sensor measurement value. However, the data medium in in reference cases as non-query targets is not limited to one type and may be two or more types including image, moving image, text, speech, and sensor measurement value. This makes it possible to cross-modal case query. A case query apparatus according to application example 5 will be described. Assume that in the following description, a data medium for a query condition is image, and data media for a reference case are image and information material. An information material is data generated by a text. In addition, a meta query condition is a meta query text as in this embodiment.

FIG. 15 is a view showing an outline of case query processing according to application example 5. As shown in FIG. 15, a query image 151 and a meta query text 152 are obtained. For the sake of simplicity, assume that the query image 151 and the meta query text 152 are respectively identical to the query image 31 and the meta query text 32 shown in FIG. 4. As reference case databases in application example 5, a reference image database 153 and a reference information material database 154 are prepared. The reference image database 153 stores many reference images 155$n$ ($2 \leq n \leq N$, where N is a natural number of 2 or more) as query targets. Each reference image 155$n$ is associated, in terms of similarity, with the query image 151 from the viewpoint of the meta query text 152 calculated by a similarity degree calculation unit 113 in advance. The reference information material database 154 stores many information materials 156$m$ ($2 \leq m \leq M$, where M is a natural number of 2 or more and may or may not be equal to N). As the information materials 156$m$, reports and the like about various cases may be used. Each information material 156$m$ is associated, in terms of similarity, with the query image 151 from the viewpoint of the meta query text 152 calculated by the similarity degree calculation unit 113 in advance.

As shown in FIG. 15, a query unit 114 queries a similar reference image similar to the query image 151 for the reference image database 153 based on similarity degrees and queries a similar information material similar to the query image 151 for the reference information material database 154. The presentation unit 115 presents a similar reference image 1561 and a similar information material 1563 as query results.

Application Example 6

Application example 1 and the like described above use a closed question that limits an answer to "Yes" or "No". However, as a question according to this embodiment, an open question that assumes an answer which is arbitrary to some extent can be used. As an open question according to application example 6, for example, an open question that is restrictive for the selection of an answer word from a finite number of word choices can be used. Assume that a restrictive open question is used. In this case, for example, with respect to the question "What is the person doing?", an appropriate word is selected as an answer word from the word choices "baseball", "tennis", "dining", and the like.

Application Example 7

A similarity degree in application example 1 described above is the matching rate between answer words concerning a query image and a reference image (that is, answer words each exhibiting the highest prediction score among a plurality of word choices). A similarity degree calculation method is not limited to only the method described in application example 1. For example, a similarity degree may be calculated in consideration of not only the match or not match between answer words considering a query image and a reference image but also the prediction score of the answer word. The higher the prediction score of an answer word, the higher the similarity degree. More specifically, when answer words concerning a query image and a reference image match, a matching rate is multiplied by a coefficient designed to have a larger value with an increase in the prediction score of each of answer words concerning a query image and a reference image. The product is used as a similarity degree. For another example, the matching rate may be multiplied by a coefficient designed to have a larger value as the prediction score of a query image becomes closer to the prediction score of a reference image.

In the case of a restrictive open question like that used in application example 6, a similarity degree may be calculated based on not only a word choice of a plurality of word choices which exhibits the highest prediction score but also word choices exhibiting the second to the kth (k is a natural number of 2 or more) highest prediction scores. For example, K word choices exhibiting the second to the kth prediction scores concerning a query image and a reference image are selected, and the matching rates (to be referred to as individual matching rates hereinafter) of the selected K work choices are calculated. An individual matching rate is calculated for each question included in a questioning sentence. A similarity degree is calculated based on a plurality of individual matching rates concerning a plurality of questions included in the questioning sentence. For example, the value obtained by multiplying a plurality of individual matching rates is preferably calculated as a similarity degree.

For another example, each answer word concerning each of a query image and a reference image may be encoded and converted into a text feature amount (to be referred to as an answer feature amount hereinafter), and the distance between the answer feature amount of the query image and the answer feature amount of the reference image is calculated as a similarity degree. As the distance, a cosine similarity degree, a difference value, or the like is preferably used. Assume that in this case, answer words concerning a query image and a reference image themselves differ from each other. Even in this case, when the answer words are semantically close to each other, a high similarity degree is obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A case query apparatus comprising a processing circuit configured to:
   acquire a query condition represented by data of a case as a query target,
   acquire a meta query condition represented by a description concerning a viewpoint to focus on when querying a case similar to the query condition,
   calculate a similarity degree between the query condition and each of a plurality of reference cases represented by data of a case as a query target,
   query a similar reference case similar to the query condition from a viewpoint of the meta query condition, among the plurality of reference cases, based on the similarity degree,
   present a query result on the similar reference case;

wherein the processing circuit:
  calculates a first feature amount based on a combination of the query condition and the meta query condition and a second feature amount based on a combination of the reference case and the meta query condition, and
  calculates a distance between the first feature amount and the second feature amount as the similarity degree.

2. The apparatus according to claim 1, wherein the meta query condition is a text which describes, in a natural language sentence form, a relationship between a plurality of targets to focus on, the plurality of targets being included in the query condition.

3. The apparatus according to claim 1, wherein the processing circuit:
  calculates a feature amount of the query condition, a feature amount of the meta query condition, and a feature amount of the reference case by projecting the query condition, the meta query condition, and the reference case onto a same feature amount space,
  calculates the first feature amount based on the feature amount of the query condition and the feature amount of the meta query condition, and
  calculates the second feature amount based on the feature amount of the reference case and the feature amount of the meta query condition.

4. The apparatus according to claim 3, wherein the processing circuit calculates, as the similarity degree, a matching rate between a first status concerning the meta query condition of the query condition and a second status concerning the meta query condition of the reference case.

5. The apparatus according to claim 4, wherein the meta query condition is a questioning sentence concerning a viewpoint to focus on, and
  the processing circuit estimates a first answering sentence concerning the questioning sentence based on the query condition as the first status and estimates a second answering sentence concerning the questioning sentence based on the reference case as the second status.

6. The apparatus according to claim 5, wherein the processing circuit estimates the first answering sentence from the query condition and estimates the second answering sentence from the reference case by using a learned model that estimates an answering sentence to a questioning sentence concerning a case.

7. The apparatus according to claim 6, wherein the viewpoint to be focused includes a plurality of viewpoints,
  the questioning sentence includes a plurality of questions respectively corresponding to the plurality of viewpoints,
  the first answering sentence and the second answering sentence include a plurality of answers respectively corresponding to the plurality of questions, and
  the similarity degree is a matching rate between the plurality of answer patterns included in the first answering sentence and the plurality of answer patterns included in the second answering sentence.

8. The apparatus according to claim 7, wherein the processing circuit displays, as the query result, not less than the one similar reference case, of the plurality of reference cases, which has the similarity degree not less than a threshold and the second answering sentence corresponding to the similar reference case.

9. The apparatus according to claim 8, wherein the processing circuit displays the query condition and the first answering sentence.

10. The apparatus according to claim 9, wherein the processing circuit displays the second answering sentence with a visual effect corresponding to the similarity degree.

11. The apparatus according to claim 9, wherein the processing circuit:
  specifies a similar reference case, of the plurality of answers included in the first answering sentence, which matches or does not match a designated answer, and
  emphasizes the specified similar reference case on a screen or erases a similar reference case other than the specified similar reference case from the screen.

12. The apparatus according to claim 6, wherein the data is an image, and
  the processing circuit detects an ROI including a region seemed to be an object from the image, extracts an ROI feature amount concerning the ROI, segments the image into a plurality of regions, calculates a segmentation feature amount of the region, and calculates a feature amount of the query condition by fusing the ROI feature amount with the segmentation feature amount.

13. The apparatus according to claim 1, wherein the processing circuit further displays the similarity degree between the similar reference case and the query condition.

14. The apparatus according to claim 1, wherein the processing circuit presents a warning as the query result when not less than one similar reference case, of the plurality of reference cases, which has the similarity degree not less than a threshold, is specified.

15. The apparatus according to claim 1, wherein the data includes at least one type of image, moving image, text, sound, and sensor measurement value.

16. A case query method comprising:
  acquiring a query condition represented by data of a case as a query target,
  acquiring a meta query condition represented by a description concerning a viewpoint to focus on when querying a case similar to the query condition,
  calculating a similarity degree between the query condition and each of a plurality of reference cases represented by data of a case as a query target,
  querying a similar reference case similar to the query condition from a viewpoint of the meta query condition, among the plurality of reference cases, based on the similarity degree,
  presenting a query result on the similar reference case;
  wherein the processing circuit:
    calculates a first feature amount based on a combination of the query condition and the meta query condition and a second feature amount based on a combination of the reference case and the meta query condition, and
    calculates a distance between the first feature amount and the second feature amount as the similarity degree.

17. A non-transitory computer readable storage medium including computer executable instructions, wherein the instructions, when executed by a processor, cause the processor to perform operations comprising:
  acquiring a query condition represented by data of a case as a query target,
  acquiring a meta query condition represented by a description concerning a viewpoint to focus on when querying a case similar to the query condition,
  calculating a similarity degree between the query condition and each of a plurality of reference cases represented by data of a case as a query target, querying a similar reference case similar to the query condition from a viewpoint of the meta query condition, among the plurality of reference cases, based on the similarity degree, presenting a query result on the similar reference case;

wherein the processing circuit:

calculates a first feature amount based on a combination of the query condition and the meta query condition and a second feature amount based on a combination of the reference case and the meta query condition, and calculates a distance between the first feature amount and the second feature amount as the similarity degree.

18. A case query apparatus comprising a processing circuit configured to:

acquire a query condition represented by data of a case as a query target, acquire a meta query condition represented by a description concerning a viewpoint to focus on when querying a case similar to the query condition, calculate a similarity degree between the query condition and each of a plurality of reference cases represented by data of a case as a query target, query a similar reference case similar to the query condition from a viewpoint of the meta query condition, among the plurality of reference cases, based on the similarity degree, present a query result on the similar reference case;

wherein the processing circuit displays, as the query result, not less than the one similar reference case, of the plurality of reference cases, which has the similarity degree not less than a threshold.

19. A case query apparatus comprising a processing circuit configured to:

acquire a query condition represented by data of a case as a query target, acquire a meta query condition represented by a description concerning a viewpoint to focus on when querying a case similar to the query condition, calculate a similarity degree between the query condition and each of a plurality of reference cases represented by data of a case as a query target, query a similar reference case similar to the query condition from a viewpoint of the meta query condition, among the plurality of reference cases, based on the similarity degree, present a query result on the similar reference case;

wherein:

the query condition is data of an image depicting a tracking target, the plurality of reference cases are data of a plurality of monitoring camera images captured by a plurality of monitoring cameras, the plurality of monitoring camera images each are associated with an installation position and a photographing time, and the processing circuit extracts a plurality of similar images, each depicting the tracking target, from the plurality of monitoring camera images, specifies installation positions and photographing times of a plurality of monitoring cameras which have captured the plurality of extracted similar images, and estimates a route along which the tracking target has traced based on the specified installation position and the specified photographing time.

20. A case query method comprising:

acquiring a query condition represented by data of a case as a query target, acquiring a meta query condition represented by a description concerning a viewpoint to focus on when querying a case similar to the query condition, calculating a similarity degree between the query condition and each of a plurality of reference cases represented by data of a case as a query target, querying a similar reference case similar to the query condition from a viewpoint of the meta query condition, among the plurality of reference cases, based on the similarity degree, presenting a query result on the similar reference case;

wherein the processing circuit displays, as the query result, not less than the one similar reference case, of the plurality of reference cases, which has the similarity degree not less than a threshold.

21. A case query method comprising:

acquiring a query condition represented by data of a case as a query target, acquiring a meta query condition represented by a description concerning a viewpoint to focus on when querying a case similar to the query condition, calculating a similarity degree between the query condition and each of a plurality of reference cases represented by data of a case as a query target, querying a similar reference case similar to the query condition from a viewpoint of the meta query condition, among the plurality of reference cases, based on the similarity degree, presenting a query result on the similar reference case;

wherein:

the query condition is data of an image depicting a tracking target, the plurality of reference cases are data of a plurality of monitoring camera images captured by a plurality of monitoring cameras, the plurality of monitoring camera images each are associated with an installation position and a photographing time, and the processing circuit extracts a plurality of similar images, each depicting the tracking target, from the plurality of monitoring camera images, specifies installation positions and photographing times of a plurality of monitoring cameras which have captured the plurality of extracted similar images, and estimates a route along which the tracking target has traced based on the specified installation position and the specified photographing time.

22. A non-transitory computer readable storage medium including computer executable instructions, wherein the instructions, when executed by a processor, cause the processor to perform operations comprising:

acquiring a query condition represented by data of a case as a query target, acquiring a meta query condition represented by a description concerning a viewpoint to focus on when querying a case similar to the query condition, calculating a similarity degree between the query condition and each of a plurality of reference cases represented by data of a case as a query target, querying a similar reference case similar to the query condition from a viewpoint of the meta query condition, among the plurality of reference cases, based on the similarity degree, presenting a query result on the similar reference case;

wherein the processing circuit displays, as the query result, not less than the one similar reference case, of the plurality of reference cases, which has the similarity degree not less than a threshold.

23. A non-transitory computer readable storage medium including computer executable instructions, wherein the instructions, when executed by a processor, cause the processor to perform operations comprising:

acquiring a query condition represented by data of a case as a query target, acquiring a meta query condition represented by a description concerning a viewpoint to focus on when querying a case similar to the query condition, calculating a similarity degree between the query condition and each of a plurality of reference cases represented by data of a case as a query target, querying a similar reference case similar to the query condition from a viewpoint of the meta query condition, among the plurality of reference cases, based on the similarity degree, presenting a query result on the similar reference case; wherein:

the query condition is data of an image depicting a tracking target, the plurality of reference cases are data of a plurality of monitoring camera images captured by a plurality of monitoring cameras, the plurality of monitoring camera images each are associated with an installation position and a photographing time, and the processing circuit extracts a plurality of similar images, each depicting the tracking target, from the plurality of monitoring camera images, specifies installation positions and photographing times of a plurality of monitoring cameras which have captured the plurality of extracted similar images, and estimates a route along which the tracking target has traced based on the specified installation position and the specified photographing time.

* * * * *